United States Patent [19]  
Takagi et al.

[11] Patent Number: 4,621,532
[45] Date of Patent: Nov. 11, 1986

[54] CHAIN-LIKE SELF-MOVING ROBOT AND CONTROL SYSTEM THEREFOR

[75] Inventors: Atsushi Takagi, Tokyo; Shigeru Izumi, Hitachi; Fuminobu Takahashi, Katsuta; Chikara Sato, Hitachi; Shinji Naitoh, Hitachi; Shinji Sonoda, Hitachi, all of Japan

[73] Assignees: Hitachi, Ltd.; Tokyo Gas Co., Ltd., both of Tokyo, Japan

[21] Appl. No.: 734,047

[22] Filed: May 15, 1985

[30] Foreign Application Priority Data

May 18, 1984 [JP] Japan .................. 59-98667

[51] Int. Cl.$^4$ .............................. G01N 29/00
[52] U.S. Cl. ...................... 73/623; 324/220
[58] Field of Search ............ 73/623, 637, 638, 640; 324/220

[56] References Cited
U.S. PATENT DOCUMENTS 4,372,161 2/1983 de Buda et al. ............... 73/623
4,460,920 7/1984 Weber ......................... 73/623

FOREIGN PATENT DOCUMENTS 47-10042 5/1972 Japan .
56-14188 4/1981 Japan .
57-51626 11/1982 Japan .

OTHER PUBLICATIONS

Nippon Kokan Tech. Report, No. 99, "The Inspection Pie Systems of Corrosion Detection for Pipeline", pp. 109–115, 1983.

Primary Examiner—Stephen A. Kreitman
Attorney, Agent, or Firm—Beall Law Offices

[57] ABSTRACT

A chain-like self-moving robot includes three or more capsule units connected to one another in a string by means of couplers. By expanding and contracting inter-capsule spaces in a predetermined sequence so that a smaller number of the capsules are moved while a larger number of capsules remain stationary, the chain-like robot can move forwardly or backwardly.

37 Claims, 29 Drawing Figures

→ MOVING DIRECTION

MOVING DIRECTION

CHAIN-LIKE SELF-MOVING ROBOT AND CONTROL SYSTEM THEREFOR

BACKGROUND OF THE INVENTION

The present invention relates to a chain-like self-moving (self-propelling) robot capable of moving within a pipeline, conduit or the like for inspection and monitoring of the interior thereof and performing works within the pipeline and other. More particularly, the invention concerns a chain-like self-moving robot suited advantageously for movement within a pipeline or conduit of a relatively small diameter such as pipeline for fuel gas supply service, although the invention is never restricted to such application.

Although the robot according to the invention is excellently suited for movement within a pipeline or conduit, the robot can also move (i.e. self-propel progressively) within a groove or recess, on and along a guide rail or on a floor for the purpose of inspection and work such as repair.

The robot for inspecting the interior of a gas supply pipe having a relatively small diameter in a range of 50 to 80 mm which is employed for internal inspection of a pipeline in a fuel gas supply service system is imposed with requirements mentioned below.

(1) The robot has to be capable of moving within a pipeline at least over a distance on the order of 100 meters from the entry for inspection and returning to the entry.

(2) There may exist in the pipeline offset portions or steps (difference in level) of several millimeters to 1 centimeters in height. The robot must be able to pass such offset portion.

(3) The pipeline usually includes elbow portions bent at a right angle. The robot must be able to pass through such bent portion.

(4) The robot must be capable of performing inspection or examination as to the condition of the pipeline such as measurement of wall thickness, as occasion requires.

(5) The robot has to determine or confirm the position at which the robot is located, if required.

(6) The robot must be capable of communicating with an overground station, as occasion requires.

(7) The cross-section of a pipeline is not always of a circular form having a predetermined constant diameter but may present distortion or deformation on the order of 20%. Consequently, the robot must be able to move with an adequate margin even within a pipe deformed more or less.

In light of the requirements or conditions as imposed on the robot, an attempt to provide the robot with wheels for movement will encounter a great difficulty. For example, in order to pass the offset of 1 cm as mentioned in conjunction with the requirement (2), the diameter of the wheel must be selected greater than 2 cm. However, it is very difficult or practically impossible to provide the robot with the wheels having a diameter of 2 cm, when the robot is to be operated within a pipeline of 50 cm in diameter and deformed about 20%. Further, the robot is very difficult to pass through a curved portion such as a right angle elbow.

Besides, difficulty will be encountered in an attempt to connect a robot destined to move over a distance of 100 m or more while passing by curved or bent portions to the overground station through a cable for realizing mutual communication or supplying power to the robot. If the robot must travel over a distance of 100 m or more, pulling the cable, an excessively great traction power will be required. The traction force will increase in geometric series as the number of the elbows which the robot has to pass through is increased. In the latter case, the traction force as required for the robot will amount to several tens Kgf or more. Obviously, it is extremely difficult to implement the robot which can produce such a large traction force. Further, the robot must be provided with the inspecting device position confirming device and communication device in order to meet the aforementioned requirements or conditions (4), (5) and (6). This robot must additionally be implemented so that the conditions mentioned below can be met.

(i) The robot must be implemented in such a construction which need not trail the cable.

(ii) The robot must be realized with small cross-sectional dimension of 40 mm or less in diameter in order that the robot can operate within a pipeline having a diameter of 50 mm with taking into account the possible deformation of the pipeline.

(iii) In order to impart to the robot of the small cross-sectional dimension the functions of communication, inspection, position determination, self-moving and other, these various functions must be dispersed or distributed among divided sections of the robot. In that case, the robot must be realized in a chain-like structure in which the divided sections are linked serially one another in the form of a string.

(iv) The robot having no cable must exhibit an enhanced reliability so that failure does not occur in the course of operation of the robot.

As the system for inspecting the interior of a pipeline while moving within and along the pipeline, there may be mentioned an inspection pig system of corrosion detection for pipeline [refer to Nippon Kokan Technical Report No. 99, (1983)]. The inspection unit called the pig of the known inspection pig system is designed to examine or check the wall thickness of a pipeline while moving within the pipeline. However, the inspection unit itself is not imparted with self-propelling capability but moved under a pushing force exerted by a fluid medium flowing through the pipeline. Because of the pig moving or propelling mechanism, the location where the inspection unit is placed within the pipeline differs from the location where the unit is recovered.

Further, Japanese Patent Application Laid-Open No. 10042/1972 filed Oct. 12, 1971 claiming priority based on U.S. patent application Ser. No. 79859 filed Oct. 12, 1970 now U.S. Pat. No. 4,006,359 under the title "Pipeline Crawler" discloses an inspection apparatus having a self-propelling function. However, the disclosed inspection apparatus is designed for the purpose of inspecting a pipeline having a large diameter. The self-moving mechanism of this known inspection apparatus includes legs equiped with respective wheels, wherein the inspection apparatus advances by moving the legs. Consequently, the inspection apparatus is necessarily of a very complicated structure of a large size.

Japanese Patent Publication No. 14188/1981 filed July 28, 1975 by Mitsubishi Heavy Industry Co., Ltd. under the title "INTER-PIPE TRACTION APPARATUS" discloses an apparatus which moves within a pipeline under the action of expansion and contraction of the apparatus itself which are brought about by making use of compressed air.

Additionally, Japanese Patent Publication No. 51626/1982 filed May 4, 1976 by the same applicant under the title "Intra-Pipeline Crawling Apparatus" discloses a crawling or self-moving mechanism which includes stopper means and a hydraulic piston apparatus. In the case of the last mentioned two prior art apparatuses, the stopper means are pressed against the inner wall of a pipeline while the inspection apparatus is moved in the meantime. For operation of the apparatus, it is required that the inner wall of the pipeline presents a smooth surface free of offset portions. Further, the stopper means are susceptible to be obstructed by joints of the pipes or bends or elbows of the pipeline, giving rise a problem in respect to the self-moving function and hence maneuverability of the inspection apparatus.

SUMMARY OF THE INVENTION

An object of the present invention is to overcome the difficulties of the prior art apparatus and provide a chain-like self-moving (self-ropelling) robot which can be implemented in a simplified structure of a small size so that it can move within and along a pipeline in a facilitated manner.

Another object of the invention is to provide a novel method of moving or propelling the robot of the type mentioned above.

In view of the above and other objects which will be apparent as description proceeds, the invention teaches a peculiar mechanism for propelling and maneuvering the robot. The underlying principle of self-moving of the robot is similar to progressive transmission of acoustic energy. More specifically, the chain-like self-moving robot according to the invention in a generalized form comprises a number (three or more) of units which are serially interconnected in the form of a chain by couplers, devices for expanding and contracting the inter-unit spaces between adjacent units, and control device for controlling the expansion and contraction in such a manner that the expansion and contraction are sequentially transmitted from one to another inter-unit space, whereby the robot as a whole moves in a commanded direction.

For the propelling of the robot, there is utilized friction between the units constituting main parts of the robot and a surface with which the units are brought into contact, e.g. an inner wall surface of a pipeline within which the robot is operated. By selecting the number of the units which are moved simultaneously smaller than the number of the units which are held stationary, the reaction due to the movement of the former units can be sustained by the frictional force acting between the stationary units and the contact surface.

According to another aspect of the invention, there is provided a control system for a chain-like self-moving robot, which comprises the chain-like self-moving robot adapted to be placed within a pipeline for inspection, monitoring or work therein and composed of a plurality of units interline serially in a chain-like form; the units being equipped with inspection means, monitoring means or work apparatus, communication equipment and controller for controlling movement and stoppage of the robot; a control station for controlling the robot placed within the pipeline through a communication system, and transmitter/receiver means for transmitting control signals from the control station to the communication equipment of the robot while receiving the signals from the robot for transmission to the control station.

DESCRIPTION OF THE PREFERRED EMBODIMENTS

Figure 1:
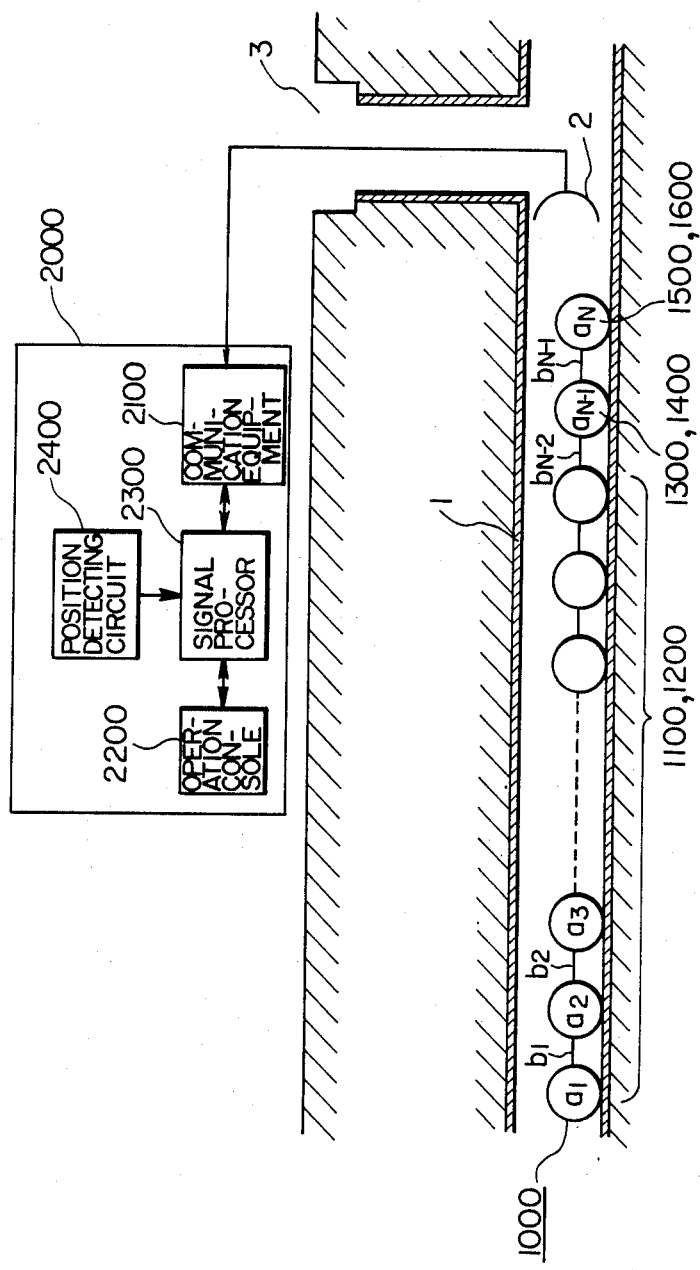
FIG. 1 is a view showing schematically a general arrangement of an intra-pipe maneuvering chain-like self-moving robot for illustrating the concept of the invention.

The intra-pipe self-propelling robot of a chain-like structure according to the invention has characteristic features mentioned below:

(a) Functions or facilities of communication, positioning, thickness measurement and others are dispersely and discretely accommodated among spherical capsules interlined serially in a chain-like fashion.

(b) The spherical capsules are interconnected by means of elastic members or universal joints so that the robot can move through a curved pipe section such as a right-angled elbow.

(c) Inter-capsule spaces between adjacent inter linked capsules are subjected to selective expansion and contraction in a predetermined sequence, to thereby allow the robot to move forwardly or backwardly.

(d) The sequence control information for controlling the inter-capsule spaces is not required to be transmitted to all the capsules at one time, but transmitted to only one of the capsules, wherein the control information is transmitted progressively from the one capsule to another one adjacent thereto and so on in a sequential manner. Due to this feature, amount of electrical conductors or wires required for interconnection of the capsule units can be significantly decreased, while the size of the over all structure is reduced with the reliability being enhanced.

(e) Each capsule is equiped with an independent power supply source so that the self-propelling function of the robot as a whole can be assured even when some of the capsules has lost the expanding/contracting function.

(f) Wireless communication is realized between the overground station and the robot through the medium of sound wave and/or light. The robot is thus free from the load owing to the trailing of a cable.

(g) By virtue of the provision of the power supply source in each of the capsules, need for the power cable is eliminated.

(h) For detecting the position of the robot within the pipeline, one of the robot and the stationary station is equiped with a sound wave transmitter while the other is provided with a sound receiver, wherein distance between the robot and the stationary station is detected on the basis of time delay due to propagation of the sound wave.

(i) A given one of the capsules is provided with an eddy current type probe or an ultrasonic probe incorporating a wave guide rod, whereby wall thickness of a pipeline can be measured without resorting to the use of water.

Now, the invention will be described in detail in conjunction with the preferred embodiments thereof by referring to the drawings.

FIG. 1 is a view showing schematically a general arrangement of a chain-like self-moving robot system which is adapted to move within a pipeline for inspection thereof. The illustrated robot system includes a chain-like self-moving robot 1000 which is placed within an underground pipeline 1 buried in the earth and adapted to travel therein, a control station 2000 installed on the ground for controlling the robot 1000, and a transmitter/receiver equipment 2 intalled within the pipeline for transmitting control signals to a communication equipment 1600 of the robot 1000 and receiving signals from the latter for transmission to the control station 2000. The transmitter/receiver equipment 2 is placed within the pipe 1 through a manhole 3. The chain-like robot 1000 is composed of a plurality of units $a_1, a_2, \ldots, a_N$ (where $N \geq 3$) and connecting elements or couplers $b_1, b_2, \ldots, b_{N-1}$ for connecting the units a. In the case of the illustrated embodiment, each of the units $a_1, a_2, \ldots, a_N$ includes a capsule of a substantially spherical form. Most of the unit $a_1, a_2, \ldots, a_N$ are arranged to serve for moving. However, the unit or capsule which is located nearest to the transmitter/receiver equipment 2 of the control station 2000 contains therein the communication equipment 1600 of the robot as well as a controller 1500 for controlling the moving and stoppage to position properly the robot. Further, an inspection apparatus and an inspection controller 1300 are accomodated within the unit or capsule which is located nearer to the transmitter/receiver equipment 2 of the control station 2000. This arrangement is advantageous in that the number of wiring conductors required for. the electrical interconnection among the units or capsules can be reduced. In this manner, a robot composed of the chain-like interlinked units or capsules is implemented which is adapted to move within pipeline while performing communication and inspections at desired positions under the command of the overground station 2000. The chain-like robot 1000 which moves forwardly or backwardly within the pipeline 1 under the command of the overground station 2000 may be designed to measure the thickness of the pipeline 1 periodically at a predetermined distance interval or at positions commanded from the overground station 2000 for transmitting the data resulted from the measurement to the station 2000 or store the data of measurement in a storage unit incorporated in the chain-like robot 1000 together with the data of positions where the measurement is performed. Further, the chain-like robot may be designed to emit a sound wave at previously scheduled time points so that the position of the robot 1000 within the pipeline 1 can be arithmetically determined on the basis of the data of the time point at which the sound wave is received by the communication apparatus 2100 of the overground station 2000. Those of the plural units $a_1, a_2, \ldots, a_N$ which are employed for movement of the robot are equiped with a moving mechanism and a moving controller generally designated by reference numerals 1100 and 1200, respectively. In FIG. 1, a numeral 2200 denotes an operator console, 2300 denotes a signal processing unit of the overground station 2000, and a numeral 2400 denotes a robot position detecting apparatus of the station 2000. The operator console 2200 includes a keyboard for the entry of commands for controlling the robot 1000. The signal processing unit 2300 processes the inspection data transmitted from the robot in association with the inspection position data into an appropriate data form. The position detecting apparatus 2400 determines the current position or location of the robot 1000 within the pipeline 1 with reference to the position of the stationary ground station 2000.

Figure 2:
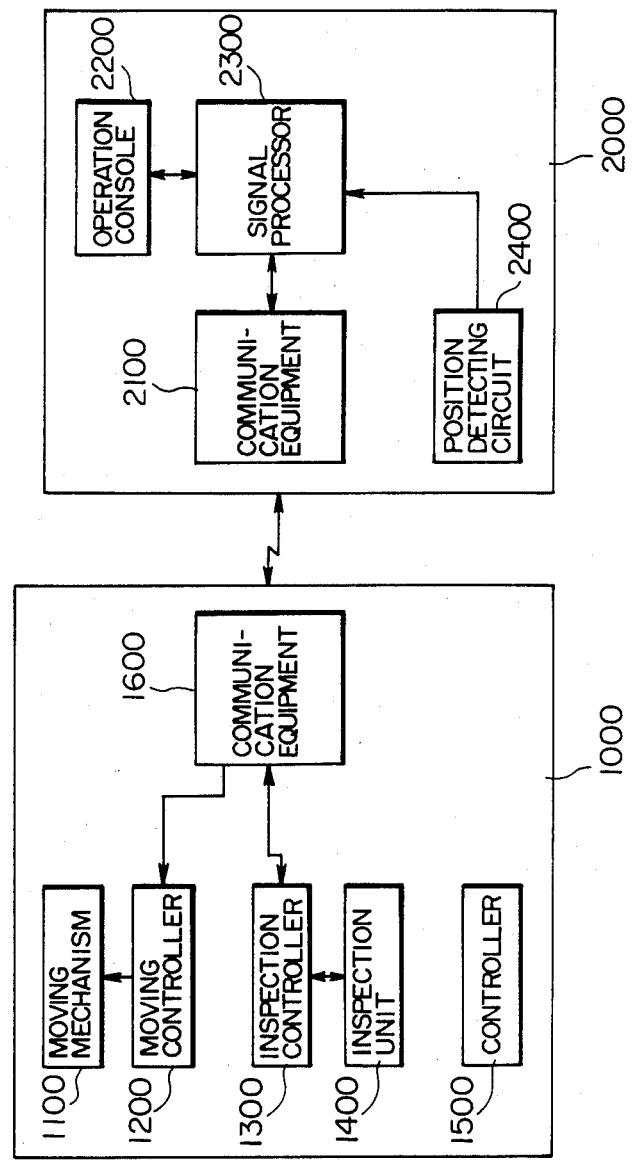
FIG. 2 is a block diagram illustrating a control system for a chain-like self-moving robot according to the invention.

FIG. 2 is a block diagram illustrating a control system for the chain-like self-moving robot according to an embodiment of the invention. Communication between the chain-like self-moving robot 1000 and the overground station 2000 is effected through the medium of a sound wave or light energy. As described above, the chain-like self-moving robot includes the moving mechanism 1100, the movement controller 1200, the inspection unit 1400 for effecting inspection such as measurement of the pipeline wall thickness, the inspection controller 1300 for controlling the inspection unit 1400, the controller 1500 for controlling the movement and stoppage of the chain-like robot 1000 to thereby position the latter within the pipeline 1, and the communication unit 1600 for allowing communication between the apparatus described above and the overground station 2000. On the other hand, the overground station 2000 includes the communication unit 2100 for performing communication with the chain-like self-moving robot 1000, the position detecting unit 2400 for determining and/or setting the position of the robot within the pipeline 1, the operator console 2200, the signal processing unit 2300 for processing and recording the data transmitted from the robot.

In the following, description will be made on the individual constituent units of the robot system as well as operations thereof.

Figure 3:
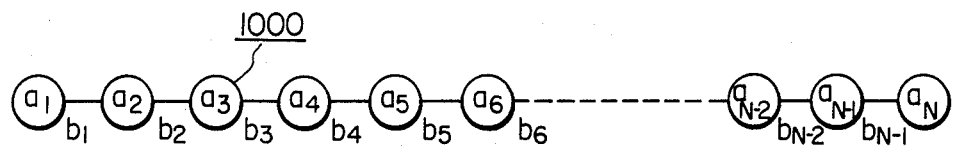
FIG. 3 is a schematic view of the whole robot according to the invention.

FIG. 3 shows conceptually the chain-like interlinked configuration of the robot 1000. As described hereinbefore, the robot 1000 includes N units or capsules $a_1$, $a_2$, ..., $a_N$ and couplers $b_1$, $b_2$, ..., $b_{N-1}$ for connecting the capsules to one another. Particular ones of rhe capsules are imparted with the communicating function, the inspecting function and the positioning function. However, most of the capsules are imparted only with the self-moving function or capability. In the following, the self-moving mechanism of the chain-like robot will first be described.

Figure 4:
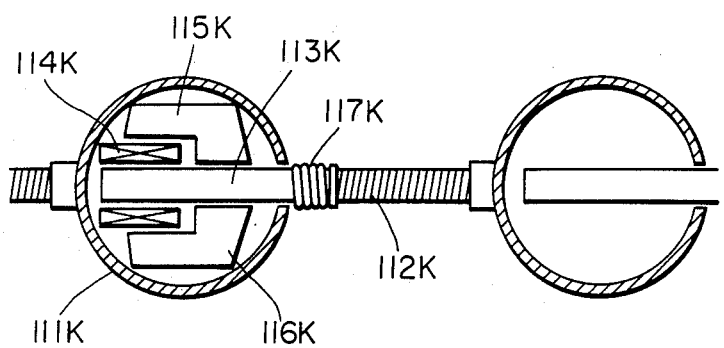
FIG. 4 is a sectional view of a main portion of the robot for illustrating inner structure thereof.

Referring to FIG. 4 which shows in an enlarged view a part of the robot of the chain-like configuration shown in FIG. 3, a self-moving mechanism accommodated within a spherical capsule 111K (where $K=1, 2, ...$ or N) is composed of a solenoid coil 114K, a battery 115K, a control circuit 116K for controlling a current supplied to the solenoid coil and a rod or bar magnet 113K extending coaxially with the solenoid coil and adapted to move axially into or out of the solenoid coil 114K in dependence on the direction of the current flowing through the solenoid coil 114K. The spherical capsule 111K is connected to the adjacent capsule by way of joint 112K. The coupler or connecting unit mentioned hereinbefore is constituted by the joint 112K and the bar magnet 113K. With this structure, the distance between the adjacent spherical capsules can be varied by the movement of the bar magnet 113K in or out of the solenoid coil 114K. Consequently, by varying the distances among the stringed capsules in a predetermined sequence, the chain-like robot 1000 can be moved forwardly or backwardly. A reference numeral 117K denotes a coil spring which serves to expand or contract fully the connecting unit or coupler in the deenergized state of the solenoid coil 114K. Consequently, by simply turning on or off the current supplied to the solenoid coil 114K, the expansion or contraction of the coupler can be realized. Further, the joint 112K itself is constituted by a coil spring. In general, the chain-like robot of this kind is frequently required to pass by a pipeline portion bent at a right angle. To meet the requirement, the joint of the coupler has to be composed of a flexible member so that the joint can flex in conformance with the bent or curve of the pipeline. To this end, the joint is constituted by the coil spring in the case of the illustrated embodiment. In this connection, it should be noted that in order to enlarge or diminish the space between the capsules under the action of the solenoid coil 114K as described above, the coil spring constituting the joint 112K should be inhibited from expansion (stretch) and contraction. Otherwise, the self-moving performance of the robot would be degraded. Accordingly, the coil spring constituting the joint should be formed of such a spring which undergoes neither expansion (stretch) not contraction, wherein the bending of the spring occurs only along the center axis thereof. As the coil spring of such property, there may be mentioned a helical coupling, by way of example. Alternatively, a wire may be inserted through the coil spring for tensioning it between both ends thereof, to thereby inhibit the expansion (stretch) and contraction. The spherical configuration of the capsule 111K is preferred because the chain-like robot can then pass smoothly the bent or curved portion or offset wall of the pipeline.

Figure 5:
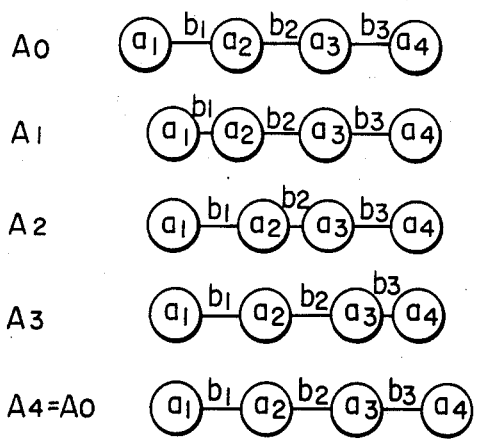
FIGS. 5 and 6 are views for illustrating mechanism of self-moving of the robot according to the invention.
Figure 6:
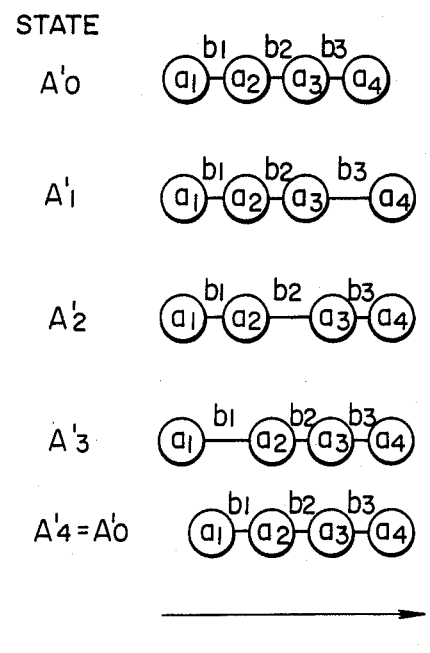

FIG. 5 is a view for illustrating conceptually the mechanism of self-moving of the chain-like robot according to an embodiment of the invention. For simplification of description, it is assumed that the robot is composed of four spherical capsules coupled to one another in a string. In FIG. 5, there are illustrated at $A_0$ to $A_4$ the various states or postures the robot assumes as a function of time lapse. On the assumption that the robot is advanced to the right as viewed in FIG. 5 starting from the state $A_0$ where all the couplers are in the expanded or stretched state, the coupler $b_1$ is first contracted to move the capsule $a_1$ to the right, whereupon the state $A_1$ is attained. Subsequently, the coupler $b_1$ is stretched while the coupler $b_2$ is simultaneously contracted to thereby cause the capsule $a_1$ to move to the right. As the result, the state $A_2$ is attained. Through the similar process, the robot is changed to the state $A_4$ by way of the state $A_3$. The state $A_4$ is same as the starting state $A_0$ except that the robot has advanced one step to the right in the state $A_4$. By repeating the state changing cycle mentioned above, the whole robot can move successively to the right as viewed in FIG. 5. For moving the robot in the reverse direction starting from the state $A_0$, the coupler $b_3$ is first contracted. Subsequently, the coupler $b_3$ is streched while the coupler $b_2$ is simultaneously contracted, which is followed by the stretching of the coupler $b_2$ and the contraction of the coupler $b_1$ which is then stretched again. Through repetition of this cycle, the robot can travel in the direction opposite to that illustrated in FIG. 5. As will be appreciated from the above description, the movement of the robot to the right or left can be realized by simply changing the sequence or order in which the individual couplers are stretched and contracted. The advantageous and important characteristic feature of this moving mechanism can be seen in that no mechanical direction reversing means is required for changing the traveling direction of the robot. FIG. 6 illustrated moving of the robot to the right as viewed therein, starting from the state $A_0'$ where all the couplers are contracted. More specifically, starting from the state $A_0'$, the coupler $b_3$ is stretched to attain the state $A_1'$. Subsequently, the coupler $b_3$ is contracted while the coupler $b_2$ is simultaneously stretched to attain the state $A_2'$. Similarly, the coupler $b_2$ is contracted with the coupler $b_1$ being stretched, which is followed by the contraction of the coupler $b_1$, to thereby realize the state $A_4'$. This final state $A_4'$ is same as the initial state $A_0'$ except that the whole robot has advanced one step to the right. Through repetition of the coupler-stretch/contract cycle mentioned above, the whole robot can continue to move to the right. In this case, the travelling direction of the robot can be reversed by changing only the sequence or order in which the couplers are stretched or contracted.

In the self-moving described above, only one of the capsules is moved at a time in transition from one to another state. It will however be understood that every other one of the stringed or interlinked capsules may be moved at a time or some numbers of them may be moved simultaneously to enhance the moving performance (or to increase the speed). In principle, the robot can self-move so long as the number of the capsules which are moved simultaneously is smaller than that of the capsules which are not moved, because of a correspondingly greater frictional force acting between the inner wall of the pipeline and the greater number of the capsule which are not moved but held stationary. For example, it is assumed that the robot is constituted by $(3 \times N)$ capsules. In that case, it is also possible to realize the moving of the robot in such a manner in which the capsules are grouped in three blocks each including N capsules, wherein the capsules in each block are moved in the same manner as the capsules $a_1$ to $a_4$ shown in FIG. 5 independent of the capsule blocks. In brief, so long as the number of the capsules to be moved is smaller than the number of the capsules to be held stationary, only the smaller number of the capsules can move in response to the stretch/contraction of the couplers, overcoming the frictional force, while the greater number of the capsules are inhibited from movement due to the action of frictional force irrespective of the stretch/contraction of the associated couplers. Accordingly, there arises no need for the means such as stopper to secure the capsules selectively on the inner wall of the pipeline in realizing the moving of the robot. In other words, moving of the robot can be realized with the mechanism of simple structure according to the teaching of the invention. However, in consideration of unevenness of the frictional forces acting between the individual capsules and the inner wall of the pipeline, it is preferred that the number of the capsules which are moved simultaneously be selected equal to one fourth or one fifth of the total number of the capsules constituting a robot. The capsule which is equipped with the communication apparatus 1600, the controller 1500 and the inspection instrument 1400 will be incapable of incorporating the moving mechanism. However, so far as the number of the capsules provided with the moving mechanism is sufficiently greater than that of the capsules equipped with no moving mechanism, no problem will arise at all in connection with the self-moving of the chain-like robot. For example, those of the capsules of the robot shown in FIG. 1 which are located near to the transmitter/receiver unit 2 and provided with no moving mechanism can be moved under the tracting or pushing force exerted by the moving mechanism of the other capsules.

Figure 7:
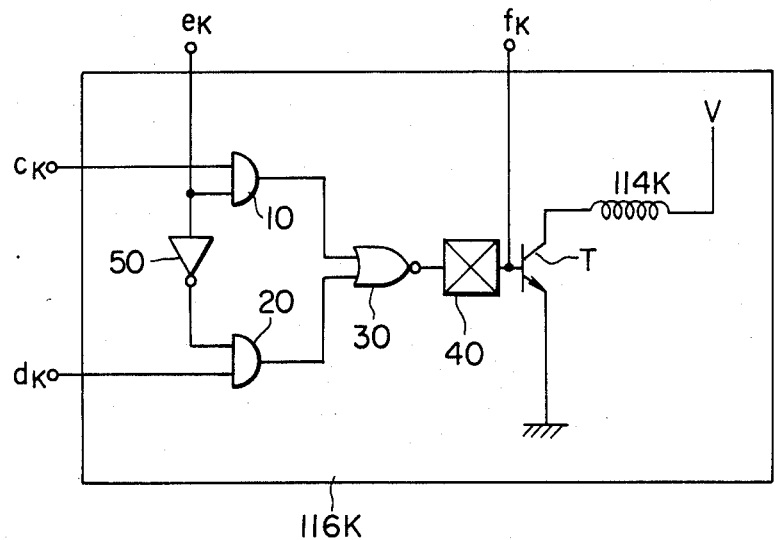
FIG. 7 is a circuit diagram showing a control circuit for controlling expanding/contracting means provided between the adjacent capsule units of the robot according to the invention.

Next, referring to FIGS. 7 and 8 in combination with FIG. 4, control of moving of the chain-like robot will be described. Referring to FIG. 4, the bar magnet 113K of the K-th spherical capsule (K=1, 2, 3, . . . , or N) is pulled into the capsule upon electrical energization of the solenoid coil 114K, whereby the distance or space between the spherical capsule 111K and the adjacent one 111 (K+1) is decreased as shown. In the deenergized state of the solenoid coil 114K, the bar magnet 113K is withdrawn from the coil 114K under the stretching force of the spring 117K, resulting in that the distance between the adjacent capsules 111K and 111 (K+1) is increased. This control can be realized by the control circuit 116K which may be configured such as shown in FIG. 7. More particularly, FIG. 7 shows a circuit arrangement of the control circuit 116K and the solenoid coil 114K both accommodated within the capsule 111K. In the figure, $e_K$ denotes an input terminal for controlling the forward and backward (reverse) movement of the robot. It is assumed that the input level of the terminal $e_K$ is logically "HIGH". Then, an AND gate 10 is enabled, wherein an input pulse applied to an input terminal $c_K$ is supplied to a one-shot multivibrator 40 which responds thereto to output a pulse which is logically "HIGH" for a predetermined time duration. As the result, a transistor T is turned on (conductive), causing a current to flow through the solenoid coil 114K. A NOR gate 30 serves to invert the input signal $c_K$ or $d_K$, while the one-shot circuit 40 is triggered by the leading edge of the output pulse of the NOR gate 30. In the control circuit 116K, the output pulse of the one-shot multivibrator 40 makes appearance at an output terminal $f_K$. When the input terminal $e_K$ is at logic "LOW" level, application of "HIGH" signal to the input terminal $d_K$ brings about energization of the solenoid coil 114K. The control circuits 116K (where K=1, 2, 3, . . . , and N) of the type mentioned above are interconnected in a manner shown in FIG. 8 for controlling moving of a chain-like robot. In the circuit arrangement shown in FIG. 8, the input and output terminals $c_K$, $d_K$, $e_K$ and $f_K$ of the control circuits 116K shown in FIG. 7 are connected in such a manner that the terminal $c_{K+1}$ is connected to the terminal $f_K$ of the control circuit 116K of the immediately preceding capsule, the terminal $d_K$ is connected to the terminal $f_{K+1}$ of the control circuit 11 (K+1) of the immediately succeeding capsule, and all the terminals $e_K$ (K=1, 2, 3, . . . , N) are connected in common. The input terminals $c_1$ and $d_N$ are supplied with a pulse signal from an oscillator 1210 through an AND gate 60 controlled by a flip-flop 1220 which sets the capsule to the movable state in response to a set signal applied to a terminal $S_2$ while setting the capsule to the stationary state in response to the reset signal applied to a terminal $R_2$. The terminal $e_K$ connected in common are applied with a control signal from a flip-flop 1230 which serves to control the forward or backward movement. Upon application of a set pulse to the input terminal $S_3$ of the flip-flop 1230, all the input terminals $e_K$ (K=1, 2, 3, . . . , and N) are set to "HIGH" level, whereby the capsules are set to the state ready for forward movement. On the other hand, application of the reset pulse to the input terminal $R_3$ of the flip-flop 1230 results in the "LOW" level at all the terminals $e_K$, whereby the capsules are set to the state ready for the backward movement. In other words, the input terminals $e_K$ are supplied with the signal commanding the forward or backward movement of the capsules.

The oscillator 1210 produces constantly pulses at a predetermined pulse interval. When the flip-flop 1220 is in the reset state, the AND gate 60 is disenabled, resulting in that the output pulse signal of the oscillator 1210 is inhibited from transmission to the control circuits 116K (K=1, 2, . . . , N), whereby the solenoid coils 114K remain deenergized. Thus, neither forward nor backward movement can take place. When the flip-flop 1230 is set, involving the "HIGH" level at the input terminals $e_K$ (where K=1, 2, ..., and N) of the control circuits 116K, the output pulse signal of the oscillator 1210 is first applied to the input terminal $c_1$ of the control circuit 1161. The output pulse signal of the oscillator 1210 applied to the terminals $d_K$ connected in common is invalid, because the input terminal $e_K$ is then of "HIGH" level, which means that the output of the inverter 50 (FIG. 7) is "LOW", blocking the AND gate 20.

Figure 8:
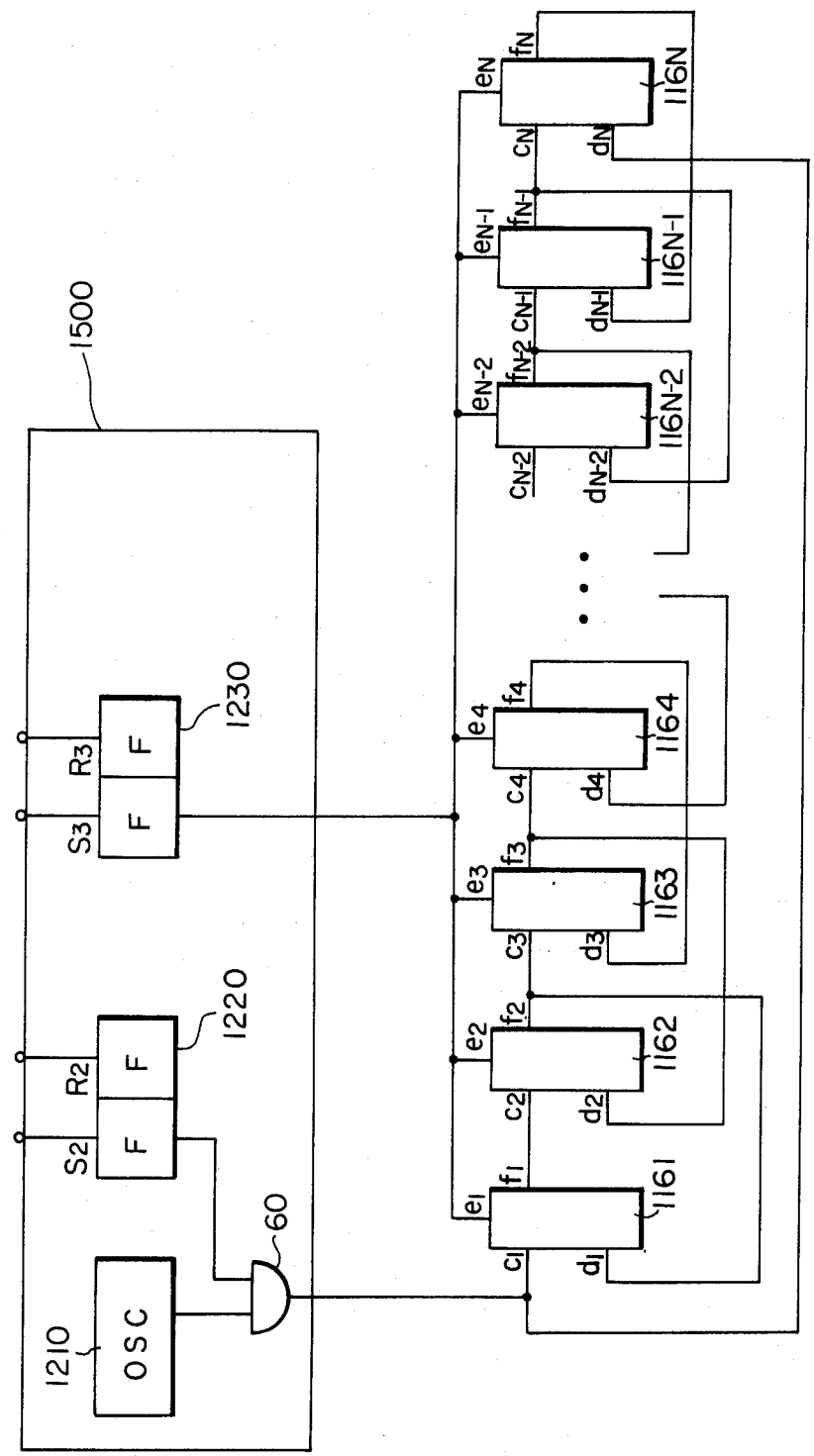
FIG. 8 is a circuit diagram showing a control circuit for controlling movement of the robot according to the invention.
Figure 9:
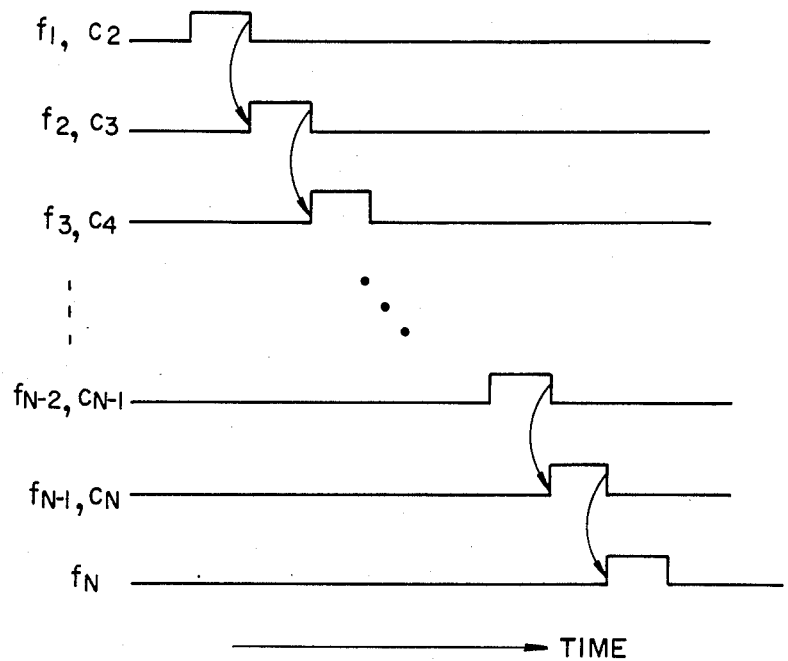
FIG. 9 shows a signal timing diagram for illustrating control operation for moving of the robot according to the invention.

Upon application of the pulse to the input terminal $c_1$ of the leftmost control circuit 1161 shown in FIG. 8, the transistor T constituting a part of the control circuit 1161 is turned on to allow a current to flow through the solenoid coil 1141, as the result of which the distance or space between the capsules 1111 and 1112 is decreased (contraction). During this period (i.e. the period of contraction), there is produced at the terminal $f_1$ a signal of a waveform shown in the signal timing chart of FIG. 9 at $f_1$, $c_2$. Because the input pulse applied to the input terminal $c_1$ of the control circuit 1161 is inverted through the NOR gate 30, the one-shot circuit 40 is triggered in response to the trailing edge of the input pulse $c_1$, producing the output waveform. Since the same applies to the adjacent control circuit 1162, a current starts to flow through the solenoid coil 1142 of the control circuit 1162 in response to the trailing edge of the signal $f_1$, resulting in that the distance between the capsules 1112 and 1113 is decreased during the duration of the signal shown in FIG. 9 at $f_2$, $c_3$. At that time point, the distance between the capsules 1111 and 1112 tends to stretch (or increase). Through repetition of the operation mentioned above, the forward movement of the robot can be realized. In the control operation, the time interval at which the pulses are produced from the oscillator 1210 may be so adjusted or regulated that the operation brought about by a given pulse is transmitted to the capsule located remote from the leading one of the capsule string by a distance corresponding to a few capsules, whereupon the succeeding pulse is produced. In other words, the pulse interval is so selected or regulated that the number of the capsules which move simultaneously is smaller than the number of the stationary capsules at any given time point. It is not necessary to delay the generation of the succeding pulse until the operation triggered by the preceding pulse has been transmitted to the trailing one of the capsule string. In the moving system under consideration, so long as movement of one of a given number of the stringed capsules is activated and transmitted to the adjacent capsules sequentially as elucidated hereinbefore, the robot can move as a whole. Thus, no severe restriction or precision requirement is imposed to the oscillation frequency of the oscillator 1210 and the delay time of the one-shot circuit 40. Turning back to FIG. 8, when the flip-flop 1230 is in the reset state, the input terminals $e_K$ (K=1, 2, ..., and N) are at the "LOW" level, and no signal is allowed to be applied to the input terminal $c_K$ (K=1, 2, ..., and N) of the control circuit 116K, while signal application to the input terminals $d_K$ (K=1, 2, ... and N) are permitted. Consequently, the pulse signal outputted from the oscillator 1210 is first applied to the final stage (N-th) control circuit 116N and transmitted to the adjacent control circuit (116N-1, then to 116N-2 and so on in the illustrated circuit) sequentially in the reverse direction. Accordingly, movement of the robot takes place in the reverse direction, i.e. the robot moves in the backward direction. As will be appreciated from the above description, the self-moving of the robot can be realized with the aid of the control circuits each of which can be implemented with an extremely small number of the circuit elements, as will be seen in FIG. 7. Further, it will be seen in FIG. 8 that the number of the signal lines or wires required for interconnection of the capsules is very small. More specifically, interconnection between the adjacent capsules requires only two wires (signal lines), while a single conductor is sufficient for connecting all the capsules inclusive of the leading and trailing ones in common, and one wire is required for the connection between the leading and trailing capsules. In total, four wires or conductors are sufficient. This number of the wires or conductors remains invariable independent of increasing in the number of the capsules of the robot.

For transmission or transfer of the control signal and the like among the capsules, a number of the requisite signal conductors or wires which are bundled in a coil-like configuration may be used for electrical interconnection of the capsules. The coiled form of the bundled conductors can of course accommodate the increase and the decrease of the inter-capsule distance. It goes without saying that the signal transfer among the capsules can be realized by using an optical fiber inserted through the joints and corresponding photo-couplers.

Figure 10:
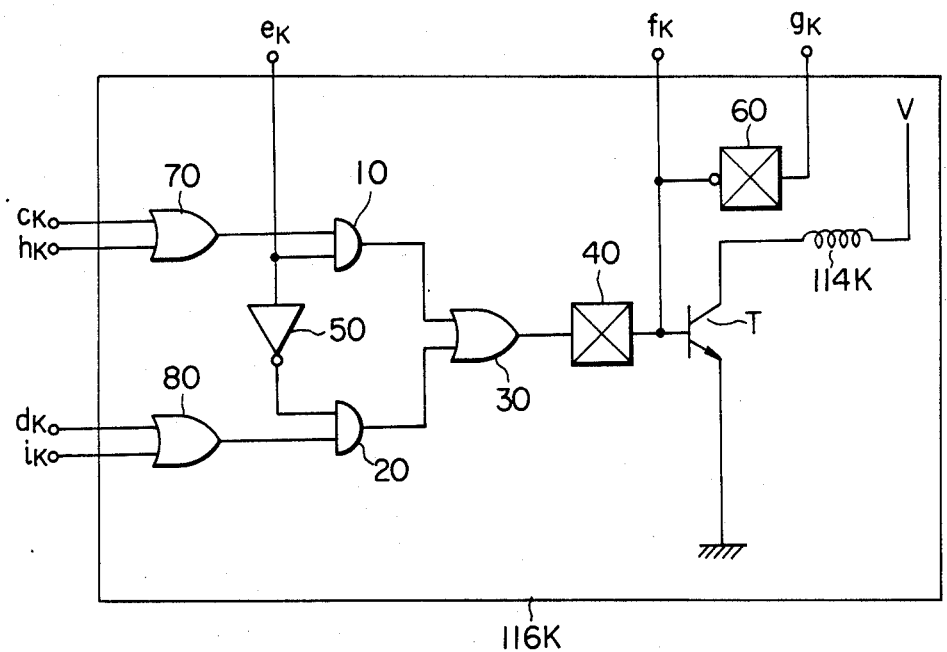
FIG. 10 is a circuit diagram showing a control circuit for controlling the expanding/contracting mechanism provided between adjacent capsule units of the robot according to another embodiment of the invention.
Figure 11:
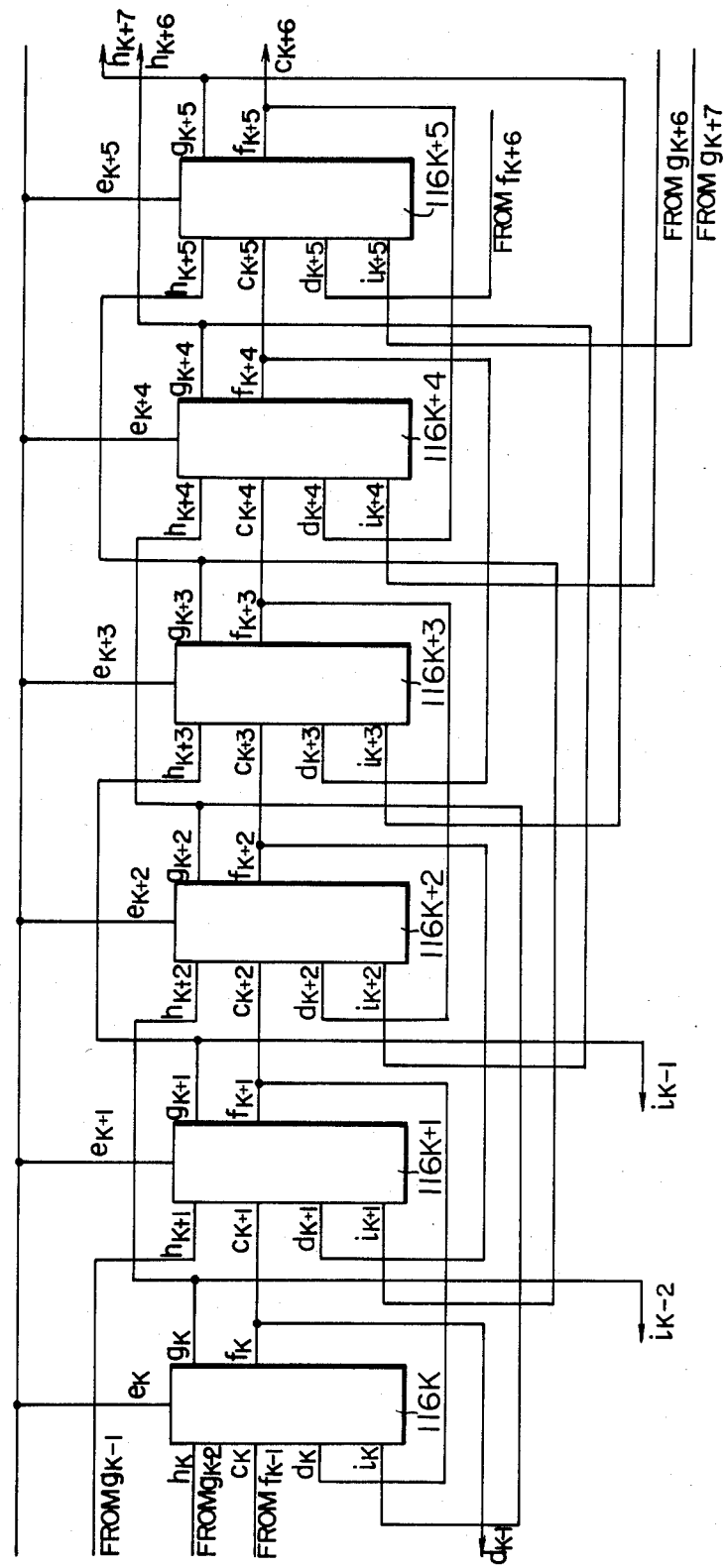
FIGS. 11 and 12 are views showing a control circuit for controlling moving of the robot according to another embodiment of the invention.
Figure 12:
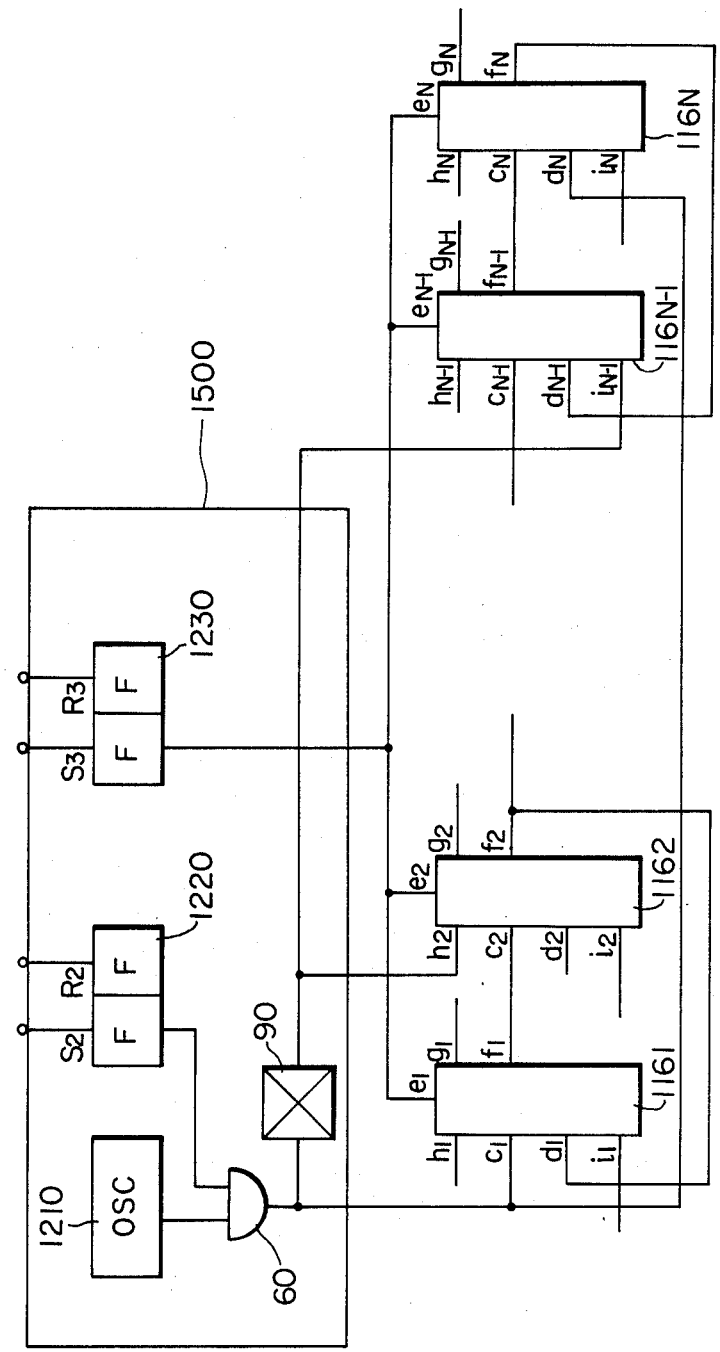

FIGS. 10 and 11 show another embodiment of the controller for controlling the self-moving of the chain-like robot. The controller according to the instant embodiment is imparted with redundancy for enhancing the reliability of the control. The control circuit shown in FIG. 10 is substantially similar to that shown in FIG. 7 but differs from the latter in that the control circuit 116K (K=1, 2, 3, ..., or N) is additionally provided with an output terminal $g_K$ in combination of a one-shot circuit 60 also additionally provided. The output terminal $g_K$ serves to take out a pulse of a predetermined duration produced by the one-shot circuit 60 in response to the trailing edge of the output pulse $f_K$ produced by the one-shot circuit 40. The duration of the pulse $g_K$ is selected equal to that of the output pulse $f_K$. Further, the control circuit shown in FIG. 10 differs from the one shown in FIG. 7 in that input terminals $h_K$ and $i_K$ are additionally provided and connected to the inputs of OR-gates 70 and 80, respectively, together with the input terminals $c_K$ and $d_K$, respectively. The control circuits 116K (where K=1, 2, ... and N) each of the circuit configuration shown in FIG. 10 are mutually connected in the manner shown in FIG. 11, in which only the connections among the control circuits 116K to 116K+5 are shown in FIG. 10, being understood that all the control circuits 1161 to 116N are connected in the same manner. In the circuit shown in FIG. 11, connections of the input terminals $c_K$, $d_K$ and $e_K$ and the output terminals $f_K$ are made in the utterly same manner as in the case of the circuit shown in FIG. 8. However, for the additionally provided input and output terminals $g_K$, $h_K$ and $i_K$ (K=1, 2, ..., N), connections are made in a manner mentioned below. In all the control circuits K (where K=1, 2, ..., N), the output terminals $g_K$ are connected to the input terminals $h_{K+2}$ and $i_{K-2}$, respectively. However, no connection is made to the input terminal $h_1$ and $i_N$ and the output terminal $g_N$. Further, the input terminals $h_2$ and $i_{N-1}$ are connected in the manner shown in FIG. 12. More specifically, both the output pulse of the oscillator 1210 and the output signal of the flip-flop 1220 are applied to the inputs of the AND gate 60 whose output signal is delayed through the one-shot circuit 90 to be subsequently applied to the input terminals h₂ and $i_{N-1}$. The delay time involved by the one-shot circuit 90 is selected equal to the duration (pulse width) of the output pulse $f_K$ or $g_K$.

The controller of the arrangement described above for controlling movement of the chain-like robot is advantageous in that the moving function or capability of the robot as a whole is never lost even when some of the capsules stringed for constituting the robot undergo failure. For example, even if every other capsule should fail in an extreme case, the robot can nevertheless move. More specifically, turning back to FIG. 8, it will be seen that the output signal $f_K$ of the K-th control circuit can be transmitted only to the terminal $c_{K+1}$ of the succeeding K-th control circuit. Accordingly, if the K-th control circuit fails to produce the output signal $f_K$ for some reason, no signal is transmitted to the (K+1)-th control circuit and those succeeding thereto. As the consequence, moving of the robot is stopped. In contrast, in the case of the embodiment described above in conjunction with FIGS. 10, 11 and 12, the output signal $f_K$ of the K-th control circuit is transmitted to the (K+1)-th control circuit and additionally the signal $g_K$ is transmitted to the (K+2)-th control circuit with some delay relative to the signal $f_K$. Accordingly, even if failure occurs in the (K+1)-th control circuit, the (K+2)-th control circuit can operate in response to the output signal of the K-th control circuit, whereby the movement of the capsule provided with the (K+2)-th control circuit as well as those succeeding to that capsule can be performed successively. It will now be appleciated that with the control system illutrated in FIGS. 10, 11 and 12, the moving performance of the robot as a whole is never lost even when some of the capsules stringed in a chain-like manner fails for some reason, whereby the reliability of robot operation can be correspondingly enhanced. It is of course possible to transmit the output signal of the K-th control circuit not only to the (K+1)-th and (K+2)-th control circuit but also to the (K+3)-th control circuit to thereby increase redundancy and hence to enhance the reliability. Although the above description has been made on the assumption that the robot moves in the forward direction, it will be readily understood that the same applies to the backward movement of the robot by transmitting the output signal of the K-th control circuit to the those 116K-1, 116K-2 and so forth.

In the robot system which is intended to be employed for inspection of pipeline as the case of the robot system being illustrated, it is necessary to determine the position of the robot for discriminatively determining those portions of the pipeline where abnormality occurs. In this connection, description will be made on a system for detecting the position of the robot within a pipeline under examination according to an embodiment of the invention.

Figure 13:
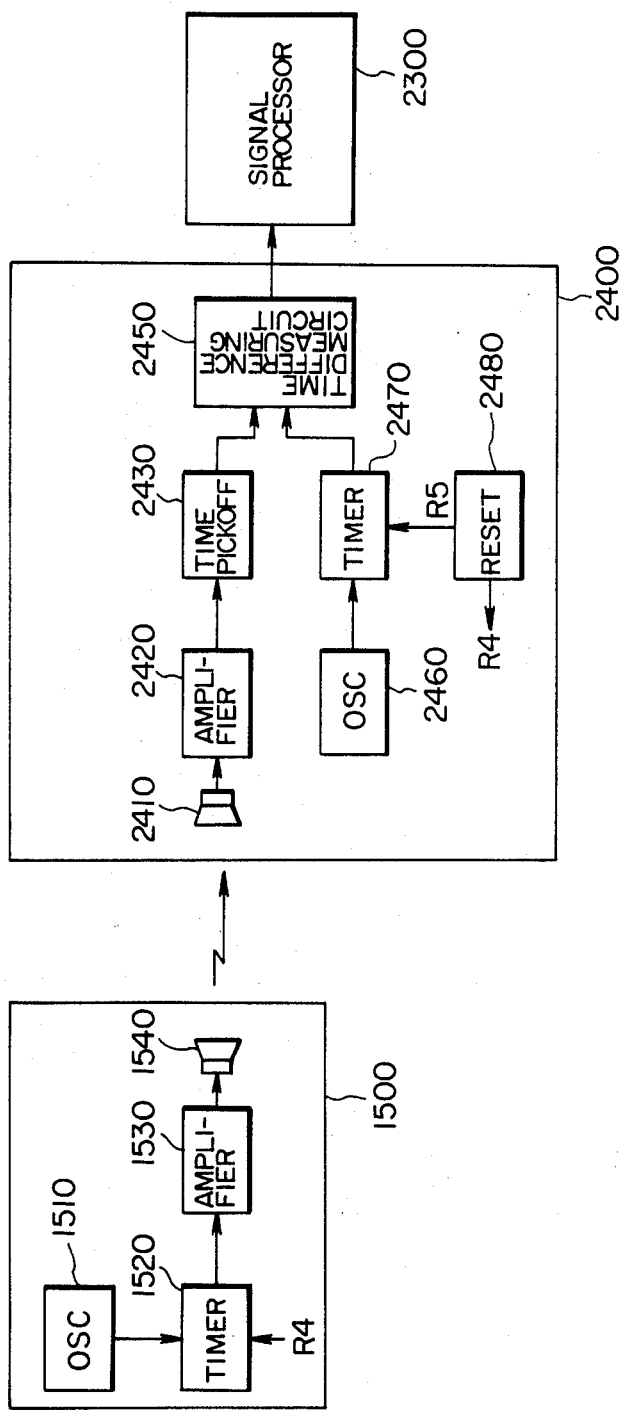
FIGS. 13 to 16 are block diagrams showing arrangement of circuits for determining position of the robot according to the invention.

FIG. 13 shows a robot position detecting circuit according to a preferred embodiment of the invention. Referring to the figure, the controller 1500 installed on the chain-like self-moving robot for controlling the moving and stoppage thereof comprises a timer 1520 for counting clock pulses generated by an oscillator 1510. When a predetermined number of pulses has been counted, a pulse is produced by the timer 1520 to be supplied to an amplifier 1530 for producing a sound wave. More specifically, the amplified pulse is supplied to a speaker 1540 which then produces the sound wave within the pipeline. This sound wave is caught by a microphone 2410 belonging to the position detecting unit of the overground station with a time delay determined by a velocity $V_o$ at which the sound wave propagates through the gas medium within the pipeline and a distance to the microphone 2410, the electric signal output of which is supplied to a time pickoff circuit 2430 for time detection after having been amplified by an amplifier 2420. The time pickoff circuit 2430 is designed to detect the first rise-up of the signal caught by the microphone 2410 and compare it with a clock pulse signal produced by a clock (not shown) to thereby determine the time point at which the sound wave signal is detected. The detected time signal is supplied to an input of a time difference measuring circuit 2450. On the other hand, the robot position detecting unit 2400 installed on the overground station includes an oscillator 2460 and a timer 2470 which produces pulses periodically at a predetermined time interval, the pulses being fed to another input of the time difference measuring circuit 2450. In that case, adjustment is so made that the output pulse signal produced by the timer 2470 of the overground station is produced simultaneously with or without a predetermined time difference (i.e. lead or lag) relative to the output pulse signal of the timer 1520 installed on the chain-like self-moving robot. To this end, the robot position detecting unit of the station includes a reset device 2480 for resetting the timers. Before placing the chain-like self-moving robot within a pipeline, both timers 2470 and 1520 are reset simultaneously by signals R₅, R₄, respectively, produced by the reset device 2480. In this manner, both the timers are synchronized in time. In case a quartz oscillator 2460 of high accuracy is employed for each of the oscillators 2460 and 1510, there can be realized an accuracy on the order of $10^{-7}$. On the condition, the chronographical error appearing between the timers 2470 and 1520 after lapse of one hour from the simultaneous resetting or synchronization can be suppressed to ca. 360 $\mu$s or less. The time difference measuring circuit 2450 measures the chronographical (time) difference between the output pulse of the time pickoff circuit 2430 and that of the timer 2470. The time difference information thus obtained is supplied to the signal processing unit 2300 to be transformed to the information or data representative of the instant or current position of the robot. Assuming now that the timers 1520 and 2470 produce simultaneously the respective output pulses, the current position of the robot (i.e. the distance L between the microphone 2410 and the speaker 1540) can be determined in accordance with $$L = V_o t \tag{1}$$

where t represents the chronographical (time) difference measured by the time difference measuring circuit 2450, i.e. the time delay involved in propagation of the sound wave produced by the speaker 1540 for the distance L to reach the microphone 2410, and $V_o$ represents the sound velocity in the gas volume within the pipeline. It should however be noted that the expression (1) applies valid on the condition that no flow is present in the gas volume within the pipeline. When the gas within the pipeline flows at a speed V, the distance L in concern must be determined in accordance with $$L = t(V_o \pm V) \tag{2}$$

where the symbol + (plus) indicates the gas flow in the direction toward the microphone from the speaker 1540 while the symbol − (minus) indicates the gas flow in the opposite direction. The speed of gas flow V can be determined by means of a suitable flow meter (not shown). Now assuming that the velocity of sound is 350 m/s and that the accuracy of the oscillator is of $10^{-7}$, error involved in the measurement of the distance L after lapse of an hour from the synchronized starting of both timers 2470 and 1520 can be confined within 10 cm or so. Magnitude of the error on this order provides no problem in practical application.

As will be appreciated from the above description, the current position of the chain-like self-moving robot can be detected and determined with an adequate accuracy for practical purpose by synchronizing the starting time of the timers provided on the robot and the ground station independently without connecting the robot and the station to each other by means of a cable or the like.

Figure 14:
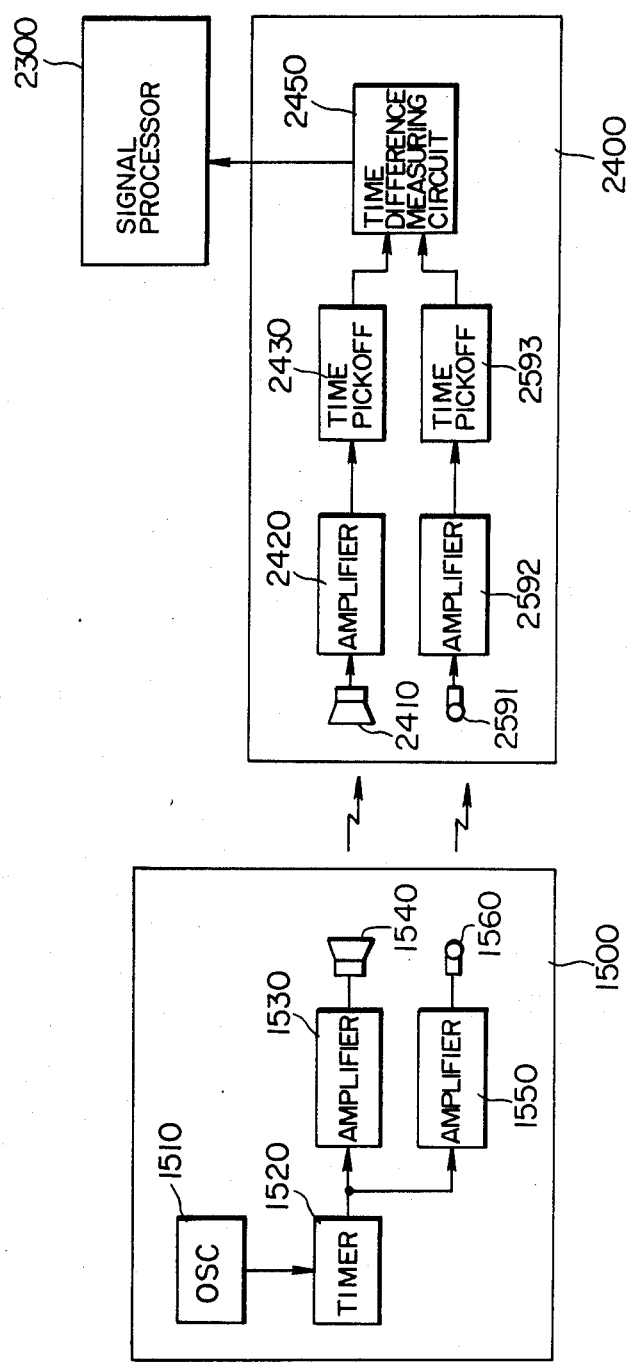

FIG. 14 shows a robot position detecting system according to another embodiment of the present invention. In the case of the instant embodiment, the position controller 1500 installed on the robot includes a light emission element 1560 to which the output pulse of the timer 1520 is applied through an amplifier 1550 in addition to the supply to the speaker 1540, so that the sound wave and light are simultaneously produced. On the other hand, in the position detecting unit of the overground station, light is received by a photoelectric sensor element 2591 in addition to the reception of the sound wave by the microphone 2410. The light impinging on the photoelectric sensor 2591 is converted into an electrical signal which is supplied to the time pickoff circuit 2593 after amplification through an amplifier 2592 for determining the time point at which the light signal is detected. The detected time signal produced by the time pickoff circuit 2593 is then supplied to the time difference measuring circuit 2540 to determine the chronographical difference between the time points at which the light signal and the sound signal are detected, respectively. Since the light signal is accompanied by substantially no time delay, the oscillator 2460 and the timer 2470 provided on the side of the overground station in the system shown in FIG. 13 can be spared. Besides, accuracy of oscillation provides no problem. However, when the pipeline under inspection has a number of bents or curvatures, intensity of light may be too weakened to be evaluated. In the system shown in FIG. 14, the robot's position can be determined in accordance with the aforementioned expression (2).

Figure 15:
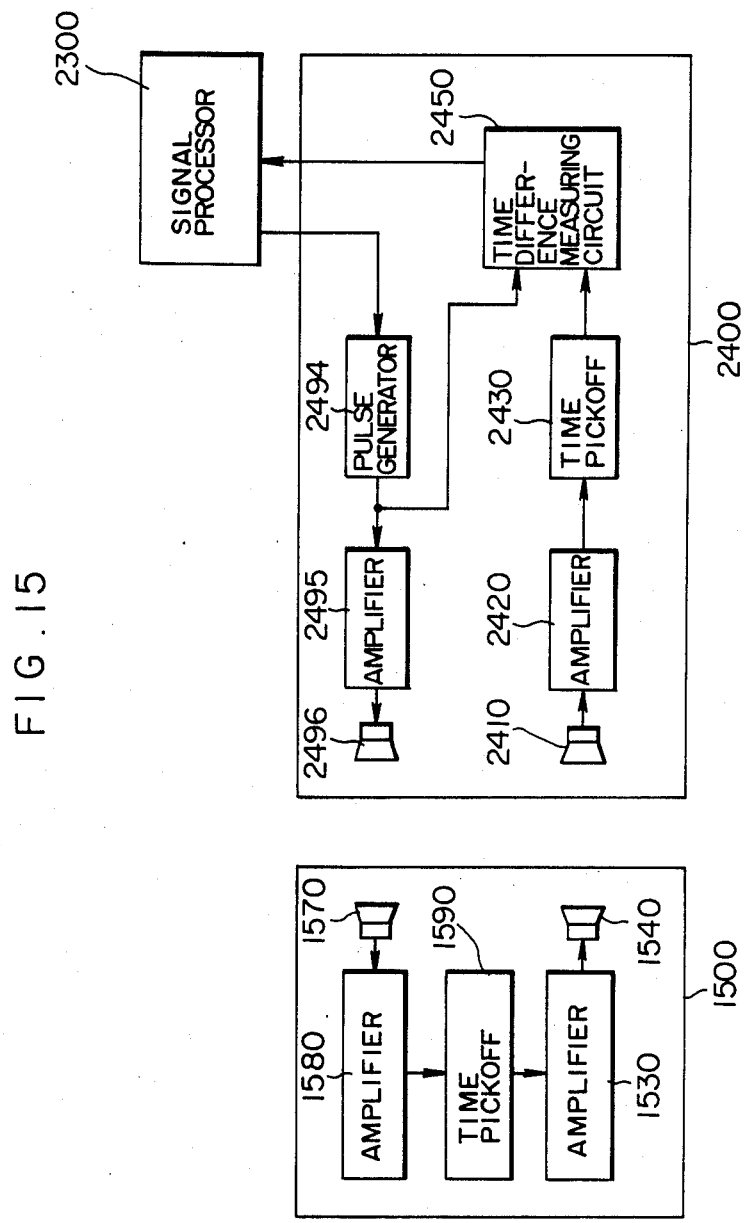

FIG. 15 shows a robot's position detecting system according to still another embodiment of the invention. Referring to the figure, the signal processing unit 2300 incorporated in the overground station sends a command signal to a pulse generator 2494 constituting a part of the robot's position detecting unit installed on the station. In response to the command, the pulse genrator 2494 produces a pulse signal which is supplied to the speaker 2496 through an amplifier 2595 for generation of a sound wave on one hand and on the other hand supplied to a time difference analyzer circuit 2450. The sound wave produced by the speaker 2496 is received by a microphone 1570 incorporated in the position controller 1500 installed on the robot. The electrical signal produced by the microphone is amplified through an amplifier 1580 and supplied to a time pickoff circuit 1590 for determination of the time point at which the sound wave signal is detected. The pulse signal produced by the time pickoff circuit 1590 and representing the detection time point is amplified through an amplifier 1530 to be converted into a sound wave signal through the speaker 1540. The sound wave thus produced propagates through the pipeline to be caught by a microphone 2410 of the overground station. The electrical signal produced by the microphone 2410 in response to the detection of the sound wave is amplified through an amplifier 2420 and supplied to the time pickoff circuit 2430 for determining the time point at which the sound wave signal is detected. The output signal of the time pickoff circuit 2430 is supplied to the time difference analyzer circuit 2450 for determining the chronographical difference relative to the output pulse signal of the aforementioned pulse generator 2494. When the time difference as determined is represented by t, the distance L can be determined as follows:

$$L = \frac{V_o t}{2} \tag{3}$$

In the robot position detecting system shown in FIG. 15, there arises no necessity for correction for taking into account the gas flow within the pipeline, if present, because the sound wave makes a return trip within the pipeline, whereby effect of the gas flow can be cancelled out.

This system can spare the timer and determine the position of the robot at a remote location without need for correction for the influence of the possible gas flow.

Figure 16:
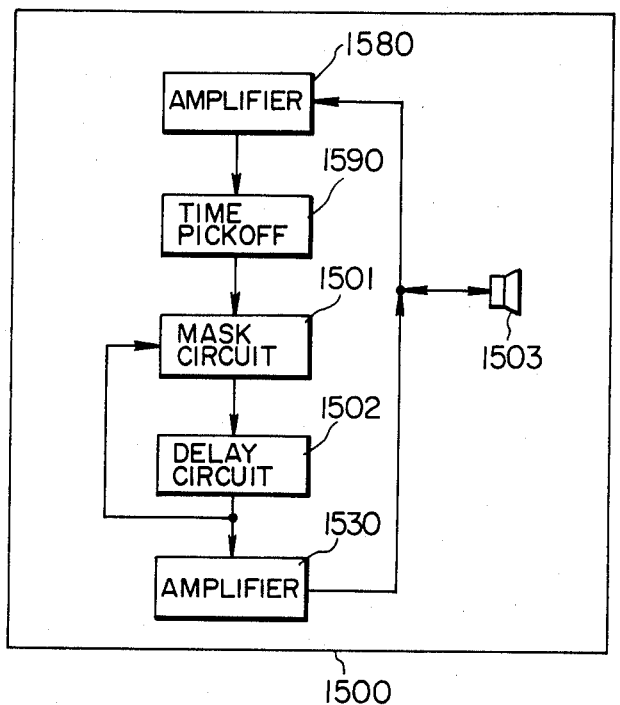

FIG. 16 shows a version of the robot position detecting system shown in FIG. 15. In the system shown in FIG. 16, the controller 1500 installed on the robot includes a sound transmitter/receiver 1503 (also referred to as tranceiver) which corresponds to an integral combination of the microphone and the speaker. The electrical signal produced in response to detection of the sound wave is amplified through the amplifier 1580 and supplied to the time pickoff circuit 1590 for determination of the time point of detection. The output of the time pickoff circuit 1590 is supplied to an amplifier 1530 through a mask circuit 1501 and a delay circuit 1502 to be radiated as the sound wave into the pipeline from the sound transmitter/receiver 1503. In this connection, it is noted that a vibrating diaphragm of the sound transmitter/receiver 1503 continues to vibrate for a while after reception of the sound wave by the sound transmitter 1503. The delay circuit 1502 is provided for allowing this vibration to be attenuated before the amplifier 1530 produces the output signal. The mask circuit 1501 functions to reject the input signal for a predetermined time and serves to prevent the signal produced by the amplifier 1530 from being again inputted to it by way of the amplifier 1580. More specifically, the output signal of the delay circuit 1502 is inputted to the mask circuit 1501 to reject the output signal from the time pickoff circuit for a predetermined time. With the system shown in FIG. 16, the position of the robot is determined in accordance with the aforementioned expression (3), where t represents however the time resulting from subtraction of the delay time of the delay circuit 1502 from the time difference determined by the time difference analyzer circuit 2450 of the position detector unit 2400 installed at the overground station. The position detecting system according to the instant embodiment is advantageous in that the unit mounted on the robot can be realized in a reduced size because the single sound transmitter/receiver 1503 is imparted with the functions of both speaker and microphone.

It will be appreciated that the systems described above in conjunction with FIGS. 13, 14, 15 and 16 are capable of detecting or determining the position of the chain-like self-moving robot within a pipeline without using any cable or the like connection means.

Figure 17:
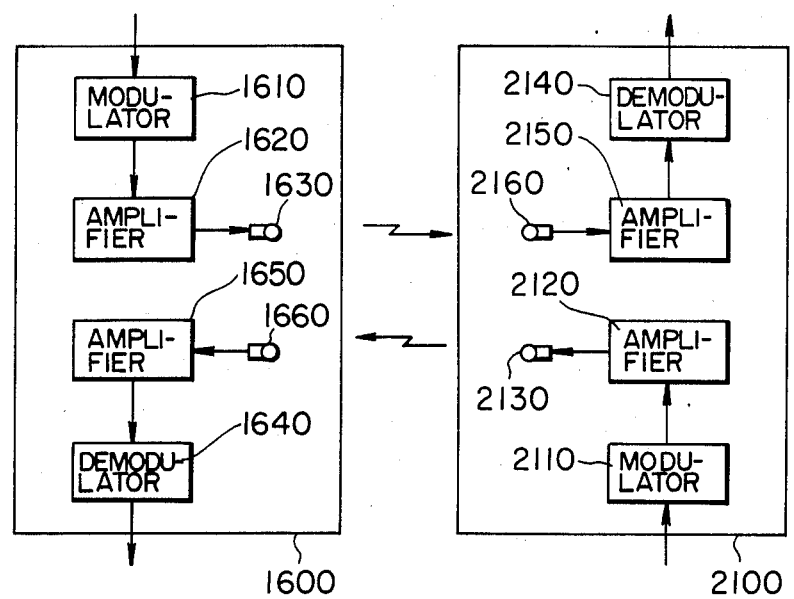
FIG. 17 is a block diagram showing a communication system for the robot according to the invention.

Next, description will be made on preferred embodiments of a communication system for transmitting the detected position signal, inspection data, commands to the robot and other required for the pipeline inspection robot system between the robot and the overground station. FIG. 17 shows a communication equipment or unit according to an exemplary embodiment of the present invention. This communication equipment is required to be installed not only at the station but also on the robot. Referring to FIG. 17, the robot communication equipment 1600 (i.e. the communication unit mounted on the robot) includes a modulator for modulating digital data signal obtained from an inspection apparatus incorporated in the robot. The modulated output signal from the modulator 1610 is amplified through an amplifier 1620 and subsequently applied to a light emission element 1630. Light signal emitted by the light emission element 1630 travels along and within the pipeline to be received by a photoelectric sensor 2160 of the station communication equipment 2100 to be converted into an electrical signal, which is then demodulated by a demodulator 2140 after having been amplified through an amplifier 2150, whereby the original digital data are restored and supplied to the signal processing unit of the overground station. The communication system includes another pair of transmitter and receiver for realizing bidirectional communication. More specifically, for the signal transmission from the station to the robot, there are provided a modulator 2110, an amplifier 2120 and a light emitting element 2130 in association with the overground station, while a photoelectric sensor element 1660, an amplifier 1650 and a demodulator 1640 are provided in association with the robot communication equipment. In the case of the communication system now being described, communication is realized through the medium of light by using the light emission elements and the photoelectrical sensors. The communication through the medium of light can be easily and effectively accomplished when the pipeline to be inspected is straight or when the transmission distance is short or the number of bent portions is small in case the pipeline is curvilinear, i.e. when the light signal undergoes little attenuation. Otherwise, the sound wave should be employed in place of the light. In the latter case, the light emission elements 1630 and 2130 are replaced by speaker, respectively, while the photoelectrical sensor elements 1660 and 2160 are replaced by microphones, respectively. In case the communication is to be performed through the medium of the sound wave, there exists an optimum carrier frequency f which depends on the diameter D of the pipeline. This frequency f can be essentially determined in accordance with $$f = \frac{V_o}{2D} \quad (4)$$

On the conditions that the diameter D of the pipeline is 5 cm and that the velocity $V_o$ of sound is 350 m/s, the frequency f is about 3.5 KHz. In the communication based on the carrier frequency of this order, the data transmission rate is on the order of 300 bits/second and can not be increased as desired. However, in consideration of the fact that data transferred between the robot and the overground station include usually no more than the inspection data obtained periodically at a predetermined distance interval within the pipeline and the signals for controlling the robot with respect to the forward and backward movement and stoppage thereof, the above data transmission rate is believed to be sufficient for practical applications. In conjunction with the use of the sound wave, it will be noted that the speaker and the microphone can be replaced by an integral sound transmitter/receiver device, as described hereinbefore with reference to the position detecting system shown in FIG. 16.

It will now be understood that the communication system shown in FIG. 17 or the version thereof in which the light is replaced by the sound wave allows communication to be performed between the station and the robot within the pipeline without using the cable. It should be added that the same light emission element and photoelectrical sensor element or same microphone and speaker can be used in common with the detection of robot position, which is preferred in that the equipment can be realized inexpensively in a reduced size.

Next, description will be made on a method of measuring thickness of a pipe which typifies the inspection of a pipeline, one of the applications of the intra-pipe self-moving robot according to an embodiment of the invention.

The exemplary method mentioned below is characteristically featured by the fact that the thickness of a pipeline can be measured even if distance between the inner surface of the pipeline and a sensor is changed, because of contacting probe means capable of accommodating such changes.

Figure 18:
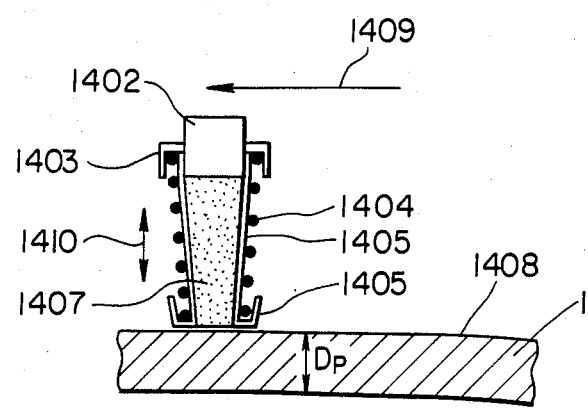
FIG. 18 is a sectional view of a main part of a wall thickness measuring unit in which an expansible and flexible tube is made use of as a probe according to an embodiment of the invention.
Figure 19:
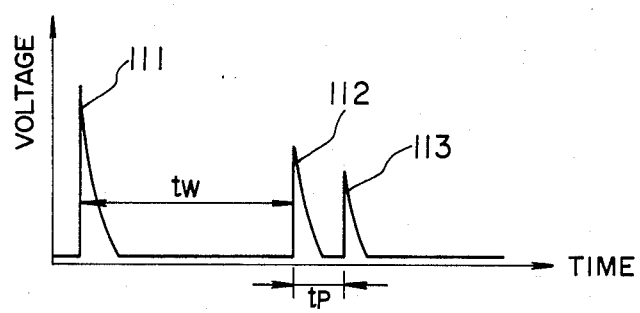
FIG. 19 is a waveform diagram illustrating a signal received by a probe shown in FIG. 18.

FIG. 18 shows a structure of a pipe wall thickness measuring unit in which an expansible waveguide constituted by a tube is made use of as the probe element. Referring to the figure, an accoustic transducer 1402 disposed in a spherical capsule has a expansible tube 1405 mounted thereon, wherein a spring is disposed around the expansible tube 1405 between a spring seat 1403 secured to the transducer 1402 and a sping seat 1406 formed integrally with the tube 1405 at the lower end thereof, which is thus resiliently urged to contact constantly with a pipe wall 1408. The tube 1405 is filled with water 1407. Ultrasonic wave emitted by the transducer 1402 is transmitted through the water 1407 to impinge on the pipe wall 1408. The echo produced by reflection of the sound wave at the pipe wall 1408 is again transmitted through water 1407 to be received by the transducer 1402. With the structure shown in FIG. 18, even when the distance between the pipe wall 1408 and the transducer 1402 should vary as the spherical capsule having the transducer 1402 mounted thereon moves in the direction indicated by an arrow 1409, the transducer 1402 is constantly brought into close operative contact with the pipe wall 1408 and held in the state to transmit the ultrasonic wave, because the probe tube 1405 which is filled with water and expansible in the direction indicated by an arrow 1410 can accommodate the variation in the distance. In the state illustrated in FIG. 18, the pulse-like ultrasonic wave emitted by the transducer 1402 is reflected by the pipe wall to be received again by the transducer 1402. The received signal (echo) is illustrated in FIG. 19, in which voltage is taken along the ordinate with time taken along the abscissa. Referring to FIG. 19, the ultrasonic pulse 111 emitted by the transducer 1402 makes first appearance. After lapse of time $t_w$, the ultrasonic echo pulse 112 reflected at the inner surface of the pipe wall 1408 is received. With a time delay $t_p$ relative to the reception of the echo pulse 112, another echo pulse 113 due to reflection at the outer surface of the pipe wall 1408 is received by the transducer 1402. The time lapse $t_w$ represents the time required for the ultrasonic wave to make a round trip over the distance $l_w$ between the transducer 1402 and the pipe wall 1408. Similarly, the time $t_p$ is required for the ultrasonic wave to make a round trip between the inner and outer surfaces of the pipe wall 1408. In this connection, when the thickness of the pipe wall 1408 is represented by $D_p$ with the velocity of sound within the pipe wall material being represented by v, the following relation applies valid.

$$D_p = v \times t_p / 2 \qquad (5)$$

Figure 20A:
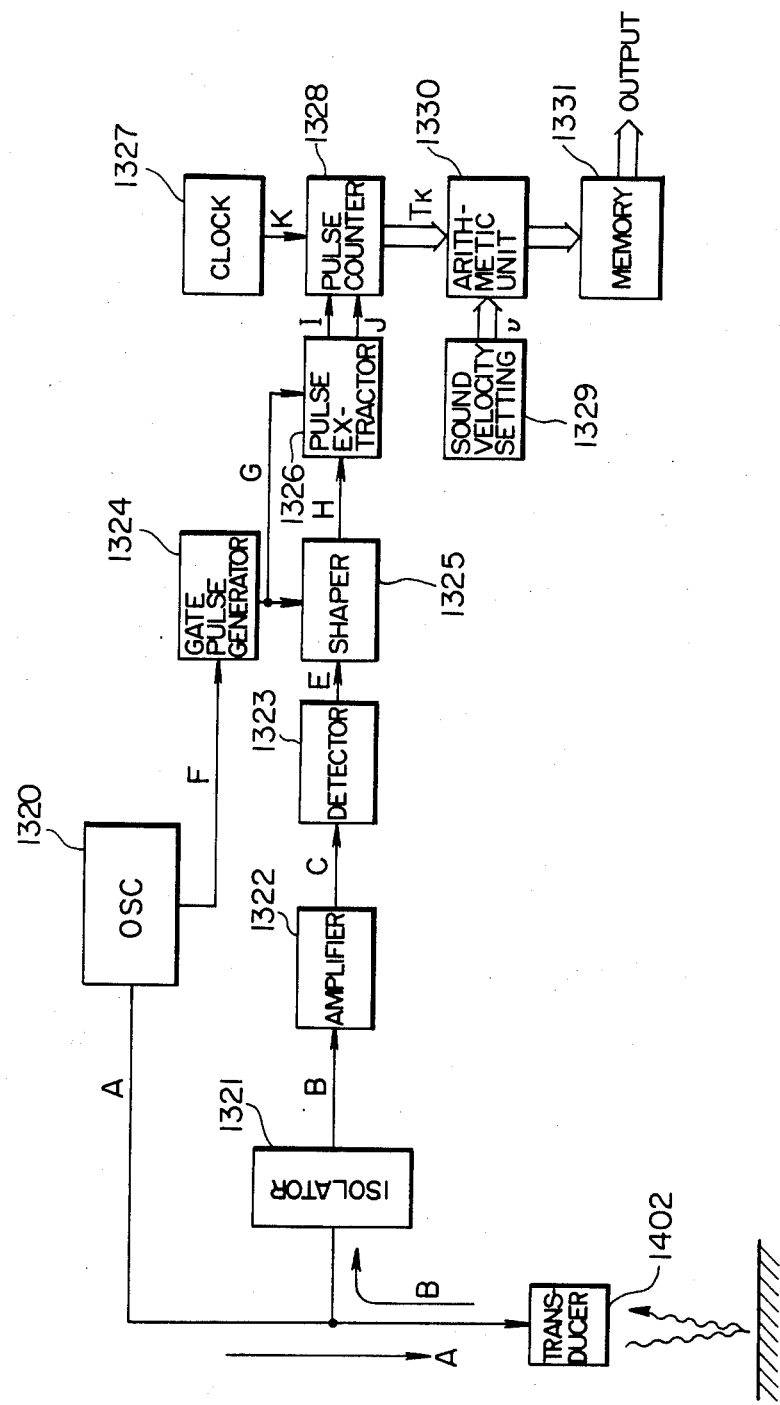
FIG. 20(a) is a block diagram showing a circuit arrangement for measuring the wall thickness by using the measuring unit incorporating the expansible tube.
Figure 20B:
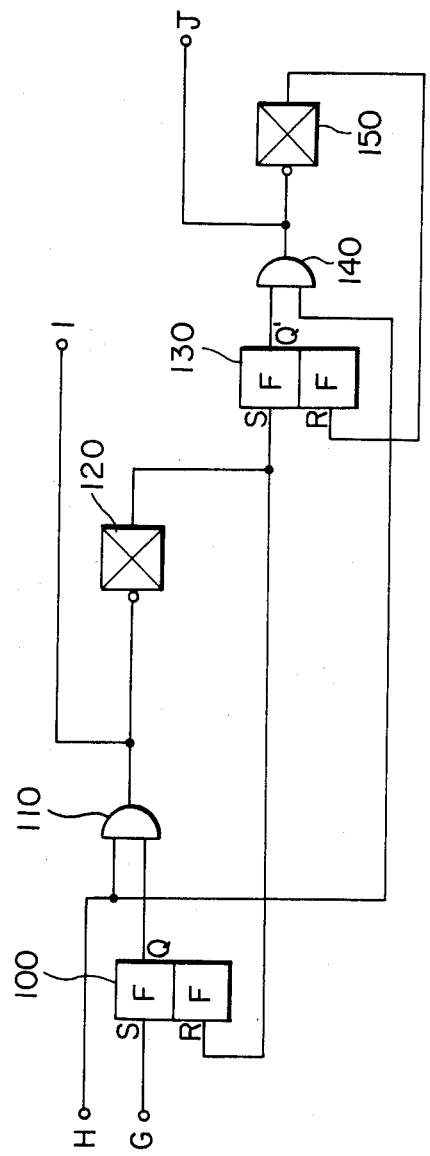
FIG. 20(b) is a circuit diagram showing a circuit comfiguration of a pulse extractor constructing a part of the circuit shown in FIG. 20(a)
Figure 21:
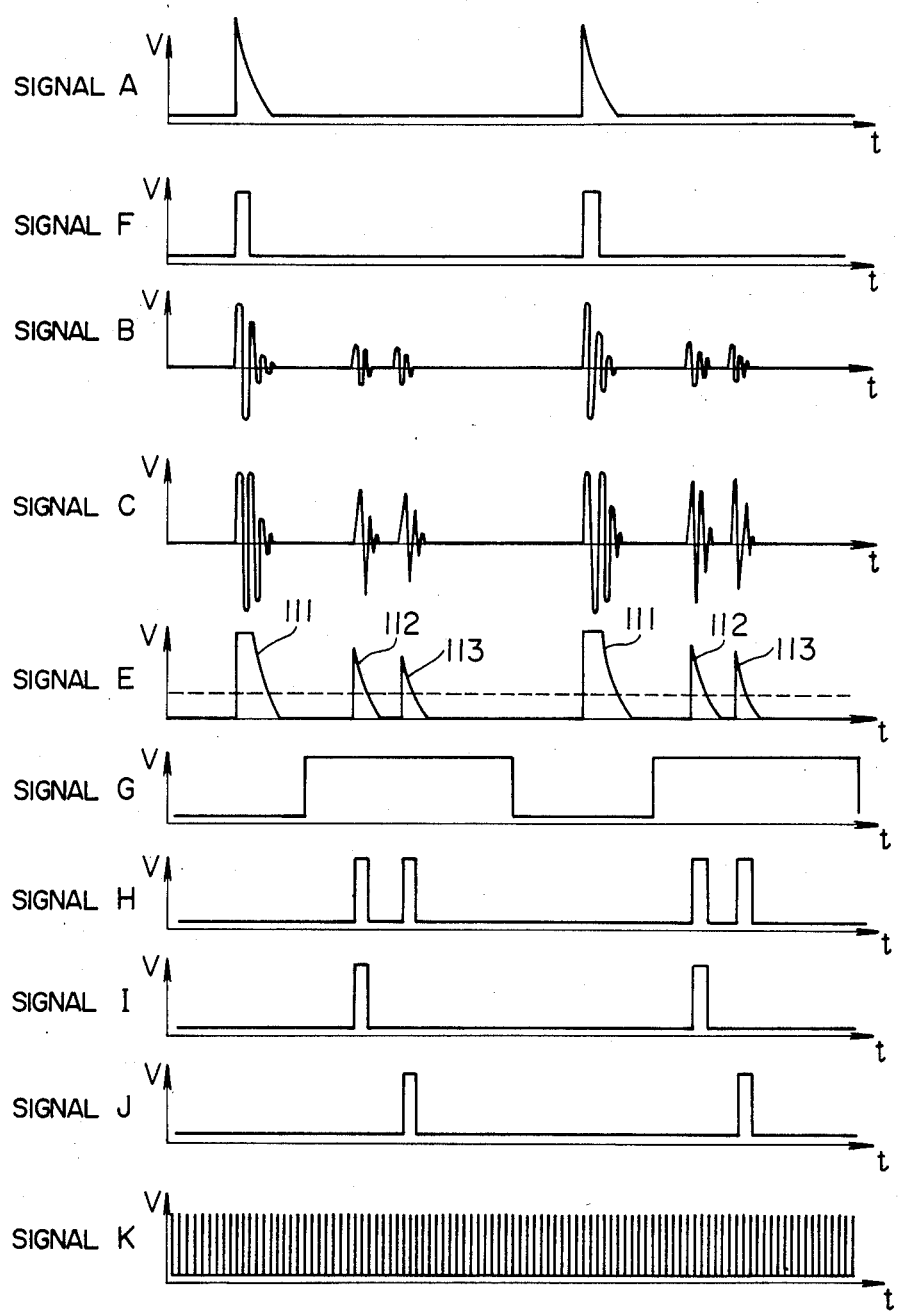
FIG. 21 is a signal timing diagram showing input/output signals produced by constituent circuitries of the circuit shown in FIG. 20(a)

In accordance with the above relation, the thickness $D_p$ of the pipe 1408 can be determined by measuring the time difference $t_p$ between the first echo 112 and the second echo 113 since the sound velocity v is known. An arrangement of a signal processing circuit for arithmetically determining the wall thickness $D_p$ is shown in FIG. 20(a). Signals produced by various circuitries of the processing circuit are illustrated in a time chart in FIG. 21. Referring to FIG. 20(a), an oscillator 1320 generates a spike-like pulse signal A of a high voltage periodically at a predetermined time interval, which signal A is applied to the transducer 1402. The transducer 1402 is constituted by a piezo-electric element which vibrates in response to application of the pulse signal A to thereby emit an ultrasonic pulse signal. The ultrasonic echo reflected at the pipe wall is received by the transducer 1402 to be converted into an electrical signal B which is supplied to an amplifier 1322 through an isolator 1321. There is thus produced on the output of the amplifier 1322 an amplified echo signal in the form of RF signal undergoing damping oscillation. The signal C is converted through a detector 1323 into a detection signal E. In response to a signal F synchronized with the leading edge of the signal A supplied from the oscillator 1320, a gate pulse generater 1324 produces a gate pulse signal G of a predetermined duration (pulse width) with a predetermined time lag to the synchronous signal F. A waveform shaper circuit 1325 converts the detection signal E having an amplitude exceeding a predetermined threshold level L (FIG. 21) and appearing during the pulse width of the gate pulse G into digital pulses H. Among the digital pulses H, the first pulse which falls within the duration of the gate pulse G is extracted through a pulse extractor 1326 as a pulse signal I, while the second pulse is extracted as a pulse signal J, both pulse signals I and J being supplied to a pulse counter 1328. The pulse extracting circuit 1326 is so designed that the pulses successively inputted thereto during a predetermined period are produced at separate outputs thereof. To this end, the pulse extracting circuit 1326 may be implemented in such a configuration as shown in FIG. 20(b) and operate in a manner mentioned below.

The output signal I can be obtained by gating the signal H through an AND gate 110 which is controlled by the output signal Q of a flip-flop 100 which assumes the "HIGH" level during a period from the rising-up of the signal G to the falling edge of the signal I. In other words, the flip-flop 100 is set by the signal G and reset by the output signal of a one-shot circuit 120 triggered by the trailing edge of the signal I.

The signal J can be obtained by gating the signal H through an AND gate 140 which is controlled by the output signal Q of a flip-flop 130. The signal Q' assumes the "HIGH" level during a period between the trailing edge of the signal I and the trailing edge of the signal J. More specifically, the flip-flop 130 is set by the output signal of the one-shot circuit 120 and reset by the output signal of a one-shot circuit 150 which is triggered in response to the trailing edge of the signal J. Through the operation of the extractor circuit 1326 described above, the output signals I and J are derived from the input signals G and H.

The pulse counter 1328 is adapted to count the clock pulses K generated by a clock pulse generator 1327 periodically at a predetermined interval for a duration between the time point corresponding to the rising-up of the pulse signal I and the time point corresponding to the rise-up of the pulse signal J, the count value $T_K$ being supplied to an arithmetic unit 1330, which then operates to arithmetically determine the wall thickness $D_p$ of the pipe in accordance with $$D_p = v \times T_K \times \Delta T / 2 \qquad (6)$$

where v represents the velocity of sound read out from a sound velocity setting circuit 1329 in which the sound velocities are stored in combination with the types of media, and $\Delta T$ represents the period of the clock pulse signal K, wherein $T_K \times \Delta T$ is equal to $t_p$ appearing in the expression (4). The wall thickness $D_p$ determined in accordance with the expression (5) is stored in a memory 1331. The stored thickness data can be read out as the thickness of the pipe wall measured by the probe unit 1402 at designated locations by issuing the read command through manipulation on the operator console of the overground station 2000. In the foregoing, there has been described measurement of the pipe wall thickness realized by making use of the time difference between echoes of the ultrasonic wave transmitted through the tube filled with water according to an embodiment of the invention.

Next, description will be made of measurement of the pipe wall thickness by making use of resonance.

Figure 22:
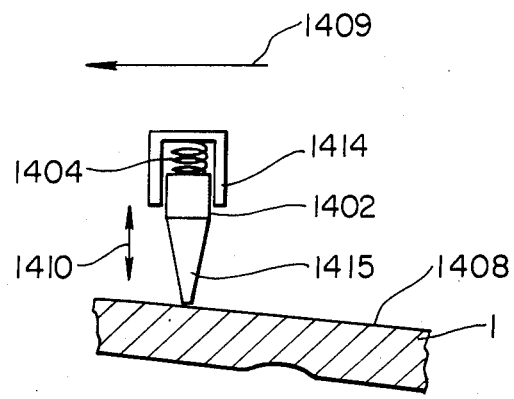
FIG. 22 is a view showing a structure of a thickness measuring unit in which a needle is employed as the probe.
Figure 23:
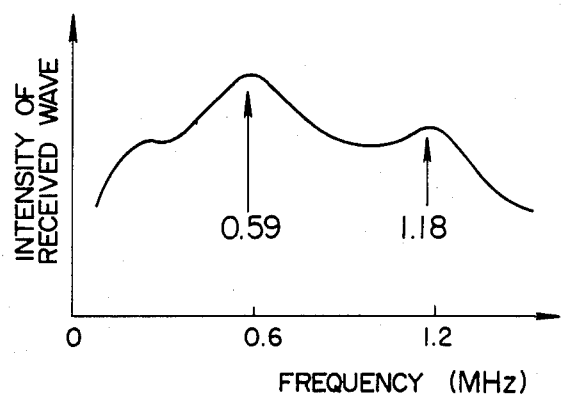
FIG. 23 is a view for graphically illustrating change in amplitude of a signal received by the proble of the structure shown in FIG. 22 in measurement of a pipe of 5 mm in thickness as a function of ultrasonic frequency.
Figure 24:
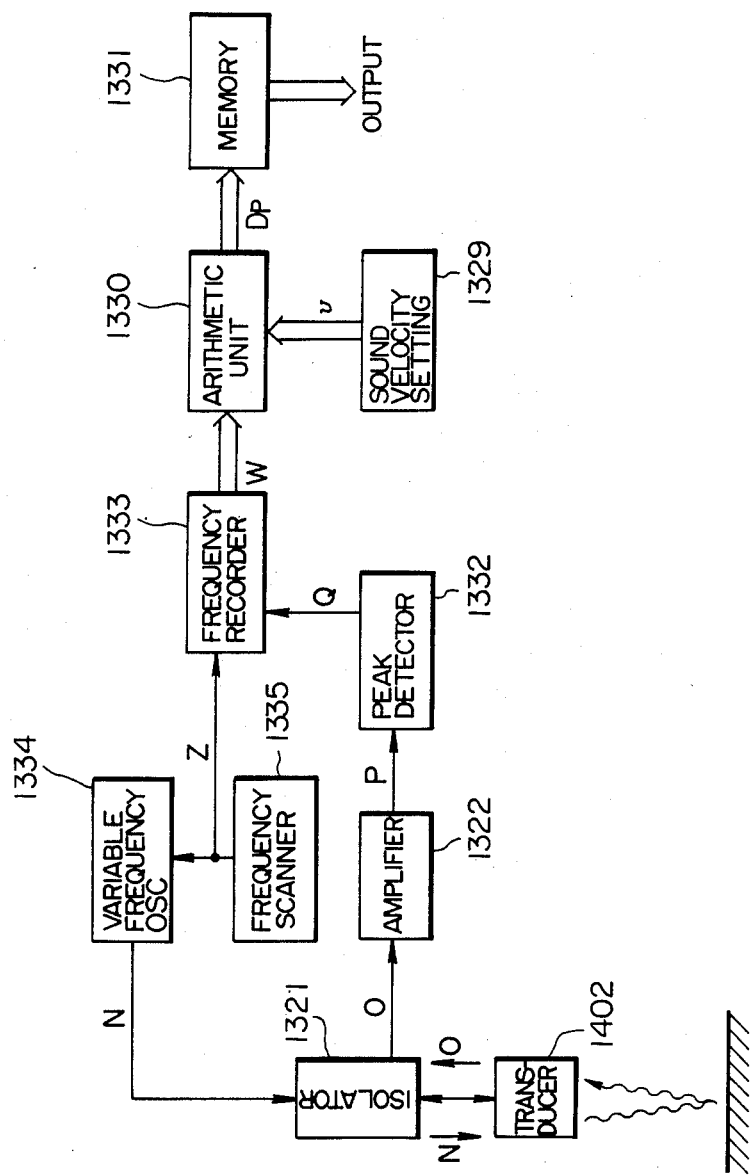
FIG. 24 is a block diagram showing a circuit arrangement for measuring a wall thickness by using a probe.
Figure 25:
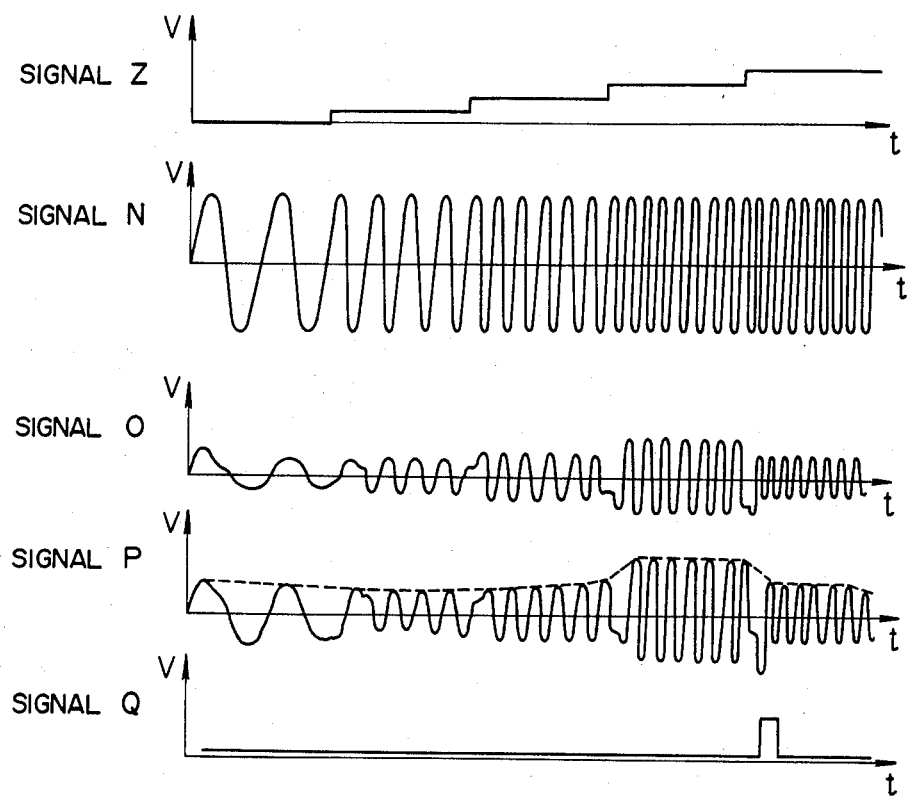
FIG. 25 is a signal timing diagram showing input/output signals of constituent circuitries of the circuit shown in FIG. 24.

FIG. 22 shows a structure of a wall thickness measuring unit in which a probe needle is employed. Referring to the figure, a reference numeral 1414 denotes a guide cylinder which is secured in the spherical capsule and adapted to house a transducer 1402 with a spring 1404 being disposed between the top of the guide cylinder 1414 and the upper end face of the transducer 1402. The transducer 1402 is connected to a probe needle 1415. Under the resilient pressure of the spring 1404, the tip of the probe needle 1415 is urged constantly to bear on the inner wall surface of the pipe 1408. When an ultrasonic wave is emitted continuously from the transducer 1402 in the state illustrated in FIG. 22, resonance will take between the ultrasonic wave reflected from the tip of the probe needle 1415 (or inner wall surface) and the ultrasonic wave reflected from the outer wall surface of the pipe. This resonance is made use of in determining the wall thickness of the pipe 1. An arrow 1409 indicates the moving direction of the measuring unit, and an arrow 1410 represents the direction in which the probe needle is vibrated. By way of example, FIG. 23 graphically illustrates change in intensity of the received wave obtained by irradiating a pipe formed of iron at a location having a thickness of 5 mm with an ultrasonic wave emitted continuously from the transducer 1402 of the unit having the structure shown in FIG. 22, wherein the intensity of the received wave is depicted as a function of the frequency of the ultrasonic wave. It will be seen that the intensity of the received wave exhibits maximum values at the frequencies of 0.59 MHz and and 1.18 Mz, respectively. Since the distance of propagation of the ultrasonic wave which impinges on the pipe wall 1408 from the tip of the probe needle 1415 and returns to the probe tip after reflection at the outer surface of the pipe wall is 10 mm and the velocity of sound within iron is 5.9 mm/$\mu$s, the wavelength at the frequency of 0.59 MHz is 10 mm=5.9 (mm/$\mu$s)/0.59 (1/$\mu$s), while the waveelgnth at the frequency of 1.18 MHz is 5 mm=5.9 (mm/$\mu$s)/1.18 (1/$\mu$s). It will thus be seen that the wavelength is an integral multiple of the propagation distance of the ultrasonic wave. More specifically, when the phase of the ultrasonic wave impinged on the inner surface of the pipe wall and reached again the inner surface after reflection at the outer surface of the pipe wall coincides with the phase of the ultrasonic wave reflected at the tip of the probe needle 1415, both ultrasonic waves intensify each other, as the result of which the amplitude of the signal received by the transducer 1402 assumes the maximum value. Accordingly, it is possible to determine the wall thickness of the pipe by varying or scanning the frequency of the ultrasonic wave emitted continuously from the probe 1402 starting from the low value of the frequency and determining the value of frequency at which the amplitude of the received wave becomes maximum. A circuit configuration for carrying out the measurement of the pipe wall thickness on the basis of the principle elucidated above is shown in FIG. 24. Operation of this circuit will be described by referring to a timing diagram shown in FIG. 25. A frequency scanner 1335 produces a signal Z having magnitude or value corresponding to a frequency or voltage and incremented stepwise at every predetermined time interval. The signal Z is supplied to a variable frequency oscillator 1334, which then produces a transmission signal N of a sinusoidal waveform having a frequency changed in dependence on the signal Z. The signal N is applied to the probe 1402 through an isolator circuit 1321, resulting in that a sinusoidal ultrasonic wave is emitted from the probe 1402. On the other hand, a signal O received by the probe 1402 is supplied to an amplifier 1322 through the isolator circuit 1321 to produce an amplified signal P. A peak detector 1332 produces a pulse signal Q at the moment the envelope of the amplified signal P goes below the maximum value. A frequency recorder 1333 fetches the value of the signal Z in synchronization with the rise-up of the signal Z and outputs that value as a signal representative of the frequency W. An arithmetic operation unit 1330′ determines the wall thickness $D_p$ on the basis of the sound velocity v inputted from a sound velocity setting circuit 1329 and the frequency W in accordance with $$D_p = v/W/2 \tag{7}$$

The thickness $D_p$ thus determined is stored in a memory 1331 for transmitting to the station the data of the wall thickness $D_p$ together with the data indicating the location where the measurement was made.

Figure 26:
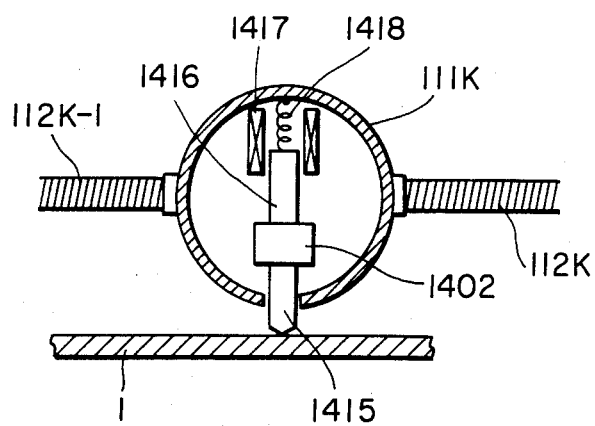
FIG. 26 is a sectional view showing the mounting of a wall thickness measuring unit equipped with a probe in a spherical capsule unit.

There has been described above the structure of the probe in which the probe needle is employed. When compared with the structure shown in FIG. 18, the probe structure shown in FIG. 22 allows the contact area between the probe needle and the wall surface to be reduced significantly, which in turn means that the wall thickness can be measured even when the inner wall surface of the pipe is rough, to an advantage. ON the other hand, the structure shown in FIG. 18 in which the expansible and flexible tube 1405 is employed is advantageous in that offset portion possibly present in the inner wall of the pipe provides no substantial obstruction to the movement of the robot because the tube can pass such offset portion due to the flexibility thereof. In contrast, the probe structure shown in FIG. 22 in which the needle 1415 is employed will be obstructed by the offset portion in the running path, if present, whereby the needle may be broken or the robot is stopped, to a serious disadvnatage. FIG. 26 shows a structure which is evaded from such disadvantage. Referring to the figure, the probe needle 1415 and the transducer 1402 mounted thereon is accommodated within the spherical capsule 111K. A magnet 1416 is mounted on the probe transducer on the side opposite to the needle 1415. The magnet 1416 can move into or out of a solenoid coil 1417. A spring 1418 is provided between the magnet 1416 and the capsule. In the deenergized state of the solenoid coil 1417, the probe needle 1415 is withdrawn in the capsule under the action of the spring 1418. For measurement of the wall thickness of pipe, the solenoid coil 1417 is electrically energized whereby the probe needle 1415 is pushed outwardly from the spherical capsule lllK and pressed against the inner wall surface of the pipe 1. With this structure, it is possible to withdraw the probe needle within the capsule in the course of moving of the chain-like robot, so that offset portion possibly present in the path of the robot provide on obstruction to the needle and hense to the capsule.

Further, the capsule shown in FIG. 26 or the capsule located adjacent thereto may be equipped with a motor to rotate the capsule about the joint 112K for inspecting any given location in the circumferential direction of the pipe.

The various embodiments described in the foregoing permit measurement of the wall thickness of a pipe by the chain-like self-moving robot.

Figure 27:
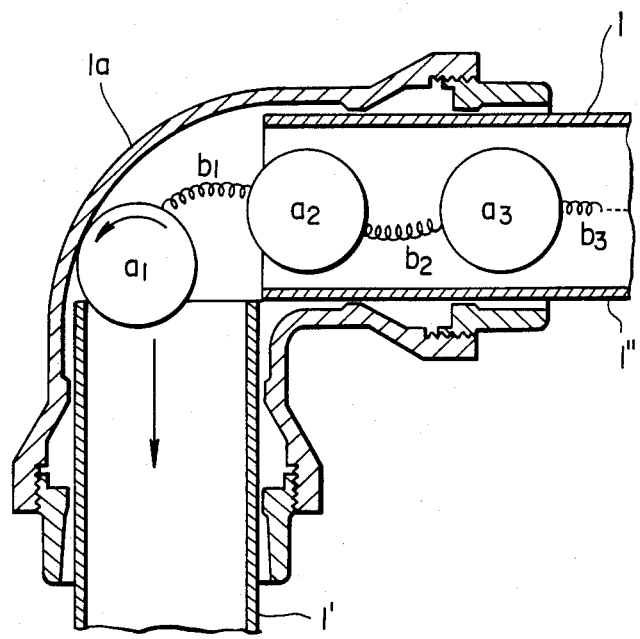
FIGS. 27 and 28 are view for illustrating movement of the robot according to the invention at a curved or bent portion of a pipeline.
Figure 28:
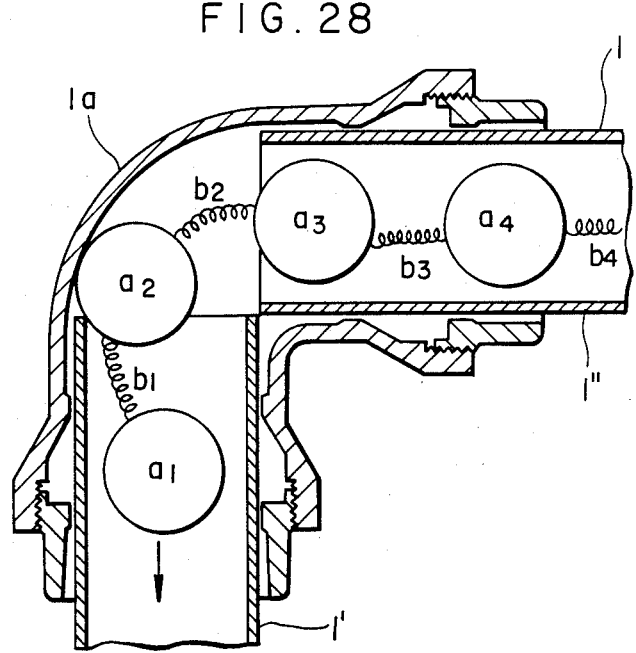

FIGS. 27 and 28 are views for illustrating operation or movement of the chain-like self-moving robot according to the invention within a pipeline bent at a right angle. At the location of the pipeline where the pipe is bent at a right angle, pipes 1′ and 1″ butting each other at a right angle is coupled together by means of a joint bend 1a. Referring to FIG. 27, it is assumed that the robot moves in the diection indicated by an arrow from the righthand side. On the assumption, the leading capsule of the robot collides with an offset portion formed between the joint 1a and the pipeline 1′. In this case, when the succeeding capsules $a_2$, $a_3$ and so forth attempt to advance, the spring (joint) of the coupler $b_1$ is bent, as the result of which the capsule $a_1$ is rotated a bit in the direction indicated by an attached arrow, whereby the pushing force exerted by the coupler $b_1$ increases the force tending to push the capsule $a_1$ toward the pipe 1′, resulting in that the capsule $a_1$ can eventually override the offset portion. In the state shown in FIG. 28, the leading capsule (the capsule $a_1$) of the robot has passed by the bend. The succeeding capsules $a_2$, $a_3$ and so forth can pass the offset in the similar manner. As the robot moves, the capsule located at the bend is applied with a traction force exerted by the preceding capsules in addition to the pushing force applied by the succeeding capsule, whereby the passage through the bent portion is facilitated. When the trailing capsule $a_N$ passes by the bent, only the traction or pulling force is active. Since the pulling force is more effective for the passage of the capsule through the bent pipe, the trailing capsule can easily pass through the bent pipe portion. As will be appreciated from the above description, the chain-like robot composed of a number of spherical capsules connected to one another by the spring couplers can easily pass through the pipe portion bent at a right angle only under the force to propel the robot without need for additional specific mechanism for allowing the robot to pass through the bent portion of the pipe.

The embodiments of the invention described above can enjoy advantages mentioned below.

(1) Due to the robot structure in which capsules are linked in a chain-like string, functions required for self-moving within a pipeline as well as inspection can be dispersed or distributed among the capsules, whereby the cross-sectional area of the robot can be reduced so that it can move within a pipe having a small diameter.

(2) Connecting device for interconnecting the adjacent capsules includes a flexible joint, whereby the robot can easily pass through even the bent pipe.

(3) Since the robot is moved through expansion (stretch) and contraction of inter-capsule spaces without using wheels, the robot can pass through offset portions possibly present in the interior of a pipeline.

(4) Moving function and control function are dispersed among the individual capsules, reliability of operation can be increased.

(5) Due to possibility of communication through the medium of sound wave and/or light, no cable is required. Further, the robot can be moved by a traction force of small magnitude.

(6) Since ultrasonic waveguide can be directly pressed against the inner wall surface for measurement of wall thickness of a pipeline, inspection can be carried out without using water.

The foregoing description has been made on the assumption that the invention is applied to the chain-like self-moving robot destined to move within a pipeline for inspection of wall thickness thereof. However, it should be understood that the chain-like self-moving robot can also move within a groove, along a guide rail or on a floor and thus can be used for various practical applications. Further, a television camera or the like may be installed in one of the capsules for monitoring the interior condition of a pipeline, or machines or tools may be mounted on the capsule or capsules for effecting repaire or the like works.

We claim:

1. A chain-like self-moving robot crawling on an object, comprising:
   at least three capsule units;
   coupling means for interconnecting said capsule units serially in a chain-like manner;
   a plurality of expanding and contracting means each provided between said coupling means and said capsule unit and capable of being in an expanding state and a contracting state, for stretching and diminishing a space between said interconnected capsules by expanding and contracting only in a direction of movement of said robot; and
   control means for controlling the expanding and contracting means in a predetermined sequence on the basis of predetermined expansion/contraction control signals, said predetermined sequence being such that a changing operation between the expanding state and contracting state is propagated through said plurality of expanding and contracting means in said direction of movement of said robot to provide a motion with less than a half of said capsule units being moved while the remaining capsule units are held stationary is repeated sequentially to move said robot as a whole.

2. A chain-like self-moving robot according to claim 1, said control means being accommodated within said capsule unit, wherein said expansion/contraction control signal is supplied to said control means accommodated within one of said capsule units, said expansion/contraction control signal supplied to said control means of said one capsule unit being subsequently transmitted to the control means of other one or more capsule units sequentially.

3. A chain-like self-moving robot according to claim 2, wherein said expansion/contraction control signal determines a time point at which expansion or contraction of said expanding and contracting means to be subsequently activated is to be started with reference to a time point at which expansion or contraction of one of said expanding and contracting means is activated.

4. A chain-like self-moving robot according to claim 3, each of said expanding and contracting means including a permanent magnet member connected to said coupling means at one end thereof, a solenoid coil located within said capsule unit, and a power supply source, wherein said permanent magnet member is disposed to move into or out of a space enclosed by said solenoid coil, and a current supply to said solenoid coil from said power supply source is controlled in response to said expansion/contraction control signal supplied from said control means for expanding or contracting a space between adjacent said capsule units.

5. A chain-like self-moving robot according to claim 4, wherein said coupling means includes a flexible member.

6. A chain-like self-moving robot according to claim 5, wherein said flexible member is composed of a coil spring.

7. A chain-like self-moving robot according to claim 6, wherein tension is applied across said coil spring by a wire for preventing said coil spring from being stretched.

8. A chain-like self-moving robot according to claim 2, each of said expanding and contracting means including a permanent magnet member connected to said coupling means at one end thereof, a solenoid coil located within said capsule unit, and a power supply source, wherein said permanent magnet member is disposed to move into or out of a space enclosed by said solenoid coil, and a current supply to said solenoid coil from said power supply source is controlled in response to said expansion/contraction control signal supplied from said control means for expanding or contracting a space between adjacent said capsule units.

9. A chain-like self-moving robot according to claim 8, wherein said coupling means includes a flexible member.

10. A chain-like self-moving robot according to claim 9, wherein said flexible member is composed of a coil spring.

11. A chain-like self-moving robot according to claim 10, wherein tension is applied across said coil spring by a wire for preventing said coil spring from being stretched.

12. A chain-like self-moving robot according to claim 1, the number of said capsule units being greater than four, wherein said expansion/contraction control signal is supplied to said control means accommodated within one of said capsule units, said expansion/contraction control signal supplied to said control means of said one capsule unit being subsequently transmitted to the control means of other one or more capsule units sequentially.

13. A chain-like self-moving robot according to claim 12, each of said expanding and contracting means including a permanent magnet member connected to said coupling means at one end thereof, a solenoid coil located within said capsule unit, and a power supply source, wherein said permanent magnet member is disposed to move into or out of a space enclosed by said solenoid coil, and a current supply to said solenoid coil from said power supply source is controlled in response to said expansion/contraction control signal supplied from said control means for expanding or contracting a space between adjacent said capsule units.

14. A chain-like self-moving robot according to claim 13, wherein said coupling means includes a flexible member.

15. A chain-like self-moving robot according to claim 14, wherein said flexible member is composed of a coil spring.

16. A chain-like self-moving robot according to claim 15, wherein tension is applied across said coil spring by a wire for preventing said coil spring from being stretched.

17. A chain-like self-moving robot according to claim 12, wherein said capsule unit is of a spherical configuration.

18. A chain-like self-moving robot according to claim 1, each of said expanding and contracting means including a permanent magnet member connected to said coupling means at one end thereof, a solenoid coil located within said capsule unit, and a power supply source, wherein said permanent magnet member is disposed to move into or out of a space enclosed by said solenoid coil, and a current supply to said solenoid coil from said power supply source is controlled in response to said expansion/contraction control signal supplied from said control means for expanding or contracting a space between adjacent said capsule units.

19. A chain-like self-moving robot according to claim 18, wherein said coupling means includes a flexible member.

20. A chain-like self-moving robot according to claim 19, wherein said flexible member is composed of a coil spring.

21. A chain-like self-moving robot according to claim 20, wherein tension is applied across said coil spring by a wire for preventing said coil spring from being stretched.

22. A control system for a chain-like self-moving robot according to claim 1, wherein said control system includes a control station for generating control commands for controlling said robot; said capsule unit of said robot including communication means for performing communication with said control station and a control circuit for controlling movement and stoppage of said robot; said control station further including transmitter/receiver means of said capsule unit and receiving signals from said communication means.

23. A control system according to claim 22, wherein said capsule unit of said robot further includes one or more of inspection means for inspecting interior of a pipeline, monitoring means and tool means.

24. A control system according to claim 23, wherein inspection means for inspecting the interior of a pipeline includes means for measuring wall thickness of said pipeline; said wall thickness measuring means including a probe which is composed of a metal rod pressed against said pipeline and a transducer for applying to said metal rod ultrasonic vibration in accordance with an electric signal and detecting the ultrasonic wave reflected by said pipeline and converting the detected ultrasonic wave into an electric signal, and arithmetic means for applying said electric signal to said probe and determining the wall thickness of said pipeline on the basis of the electric signal produced by said transducer.

25. A control system according to claim 23, wherein said inspection means for inspecting the interior of a pipeline includes means for measuring wall thickness of said pipeline; said wall thickness measuring means including a probe which is constituted by a tube pressed against said pipeline and filled with a liquid and a transducer for receiving an electric signal and applying ultrasonic vibration to said pipeline through said liquid and detecting ultrasonic wave reflected by said pipeline for converting the detected ultrasonic wave into an electric signal, and arithmetic means for applying said electric signal to said probe and determining the wall thickness of said pipeline on the basis of the electric signal produced by said transducer.

26. A control system according to claim 22, wherein said communication means and said control circuit are accommodated within one of said capsule units which is located nearest to said transmitter/receiver means of said control station.

27. A control system according to claim 22, wherein said capsule unit further includes a timekeeper and sound wave generating means for generating a sound wave in the direction toward said control station in response to indication of a predetermined time point by said timekeeper, said control station further including a timekeeper synchronised with said timekeeper of said capsule unit, detecting means for detecting said sound wave, and robot position determining means for determining the position of said robot on the basis of a time point at which said timekeeper of said station indicates the time point at which said sound wave is detected.

28. A control system according to claim 22, wherein said capsule unit further includes sound wave generating means for generating a sound wave toward said control station, and light generating means for generating light in the direction toward said control station; said control station further including sound wave detecting means and light detecting means for detecting said sound wave and said light, respectively, and means for determining the position of said robot on the basis of difference in time between detections of said sound wave and said light.

29. A control system according to claim 22, wherein said capsule unit and said control station include respective sound wave transmitting/receiving means for transmitting respective sound waves toward each other and receiving the sound waves transmitted thereto, respectively; said sound wave transmitting/receiving means of said capsule unit transmitting the sound wave to said control station in response to reception of the sound wave transmitted from said control station; said control station including means for determining the position of said robot on the basis of difference between a time point at which the sound wave transmitted from said sound wave transmitting/receiving means of said capsule unit is received and a time point at which the sound wave is transmitted toward said capsule unit.

30. A control system according to claim 22, wherein said communication means of said capsule unit is composed of either a light transceiver or a sound wave transceiver while said transmitter/receiver means of said control station is composed of either a light transceiver or a sound wave transceiver so that wireless communication is performed between said robot and said control station.

31. A method of moving a chain-like self-moving robot composed of at least three capsule units and coupling means for interconnecting said capsule units, comprising steps of:
leaving at least more than a half of said capsule units in stationary state while moving the remaining number of said capsule units by selectively expanding and contracting inter-capsule spaces in a direction of movement of the robot without substantially changing the lateral dimensions of the inter-capsule spaces, wherein the capsule units to be moved are sequentially changed over to thereby move said robot as a whole.

32. A method of moving a chain-like self-moving robot according to claim 31, wherein expansion and contraction of said inter-capsule spaces are performed in dependence on a space expanding/contracting signal which is supplied to one of said capsule units and subsequently transmitted to another one or more of said capsule units sequentially.

33. A method of moving a chain-like self-moving robot according to claim 32, wherein expansion and contraction of the inter-capsule space are effected under electromagnetic induction of a permanent magnet attached to said coupling means and a solenoid coil installed in said capsule unit.

34. A method of moving a chain-like self-moving robot according to claim 33, wherein said capsule unit equipped with said solenoid coil further includes control means for controlling the expansion and contraction of said inter-capsule space; said control signal for controlling the expansion and contraction of said inter-capsule space is supplied to said control means of one of said capsule units, said signal being subsequently transmitted sequentially to the control means of the capsule unit distanced from said one capsule unit by a few capsule units and so on for effecting the inter-capsule space expanding and contracting operation.

35. A method of moving a chain-like self-moving robot according to claim 33 adopted for conducting examination of a pipeline, wherein said capsule unit includes examining means for examining the interior of said pipeline, said robot being moved within said pipeline for examination of said pipeline.

36. A method of moving a chain-like self-moving robot according to claim 35, wherein a part of said coupling means is constituted by a flexible member so that said robot can move through a curved portion of said pipeline.

37. A method of moving a chain-like self-moving robot according to claim 31, wherein moving operation of said capsule units is performed in a manner in which a time point of the capsule unit to be next moved is determined with reference to a time point at which one of the capsule units is moved.

* * * * *